US012668440B2

(12) United States Patent
Zhong et al.

(10) Patent No.: US 12,668,440 B2
(45) Date of Patent: Jun. 30, 2026

(54) LIFTING TYPE CARRIAGE CARGO LOADING AND UNLOADING DEVICE

(71) Applicant: JIANGXI ZHONGYU MACHINERY CO., LTD, Yichun (CN)

(72) Inventors: Yubing Zhong, Yichun (CN); Yuqing Zhong, Yichun (CN)

(73) Assignee: JIANGXI ZHONGYU MACHINERY CO., LTD, Yichun (CN)

( * ) Notice: Subject to any disclaimer, the term of this patent is extended or adjusted under 35 U.S.C. 154(b) by 344 days.

(21) Appl. No.: 18/288,026

(22) PCT Filed: Jul. 11, 2023

(86) PCT No.: PCT/CN2023/106690

§ 371 (c)(1),
(2) Date: Oct. 23, 2023

(87) PCT Pub. No.: WO2024/169116

PCT Pub. Date: Aug. 22, 2024

(65) Prior Publication Data

US 2025/0083908 A1     Mar. 13, 2025

(30) Foreign Application Priority Data

Feb. 17, 2023    (CN) .......................... 202310131608.7
May 22, 2023    (CN) .......................... 202310575931.3

(51) Int. Cl.
B65G 67/12        (2006.01)
B65G 69/24        (2006.01)

(52) U.S. Cl.
CPC ............. B65G 67/12 (2013.01); B65G 69/24 (2013.01)

(58) Field of Classification Search
CPC ...... B65G 67/12; B65G 69/24; B65G 41/002; B65G 17/126; B65G 41/008; B65G 67/00;

(Continued)

(56) References Cited

U.S. PATENT DOCUMENTS 9,663,303 B2 *    5/2017  Waldner ............... B65G 41/008
11,273,748 B2 *    3/2022  Albright ................... B60P 1/30

(Continued)

FOREIGN PATENT DOCUMENTS

CN         112390023 B  *  2/2025  ............... B66F 9/22
CN         115504271 B  *  4/2025  ............. B65G 35/00

*Primary Examiner* — Sameh Tawfik

(57) ABSTRACT

The disclosure relates to the technical field of cargo loading and unloading, and discloses a lifting type carriage cargo loading and unloading device, which includes a frame, a cargo carrying mechanism and a power mechanism. The frame includes a cargo carrying platform, lifting oil cylinders and a supporting platform. The lifting oil cylinders are connected to both sides of the cargo carrying platform. The supporting platform is arranged on an upper surface of the cargo carrying platform. The cargo carrying mechanism is movably installed on the cargo carrying platform and includes a push-and-pull assembly and at least two cargo carrying assemblies. Each cargo carrying assembly is provided with a liftable upper cover. The push-and-pull assembly is used for driving the upper cover to rise or restoring the upper cover. The lifting oil cylinders drive the cargo carrying platform to move up and down.

19 Claims, 19 Drawing Sheets

(58) Field of Classification Search
CPC ........ B65G 67/02; B65G 21/12; B65G 21/14;
B65G 41/007; B65G 2207/40; B65G
65/32; B65G 2201/045
USPC ........................................................ 414/339
See application file for complete search history.

(56) References Cited

U.S. PATENT DOCUMENTS

| | | | |
|---|---|---|---|
| 12,420,450 B2 * | 9/2025 | Johnson | ................ B28C 5/0818 |
| 2005/0042068 A1 * | 2/2005 | Ehmen | ...................... B66F 9/10 |
| | | | 414/661 |
| 2023/0220632 A1 * | 7/2023 | VanderLinden | ........ E01B 29/16 |
| | | | 104/5 |

\* cited by examiner

213

313

22

11

13

14      2      323      233

13

322

141    12    11    321    32    325

1151

116

114

115

112

LIFTING TYPE CARRIAGE CARGO LOADING AND UNLOADING DEVICE

CROSS-REFERENCE TO RELATED APPLICATIONS

This patent application is a national stage application of International Patent Application PCT/CN2023/106690, filed on Jul. 11, 2023, which claims the benefit of and priority to Chinese Patent Application No. 202310131608.7, filed on Feb. 17, 2023, and to Chinese Patent Application No. 202310575931.3, filed on May 22, 2023, the disclosures of each of which are incorporated by reference herein in their entirety.

TECHNICAL FIELD

The present disclosure relates to the technical field of cargo loading and unloading, in particular to a lifting type carriage cargo loading and unloading device.

BACKGROUND

When a carriage is loaded with cargo, the cargo is generally stacked manually; and when the cargo is unloaded, the cargo is manually moved out one by one, with the result that the loading and unloading efficiency is low. For large cargo that is difficult to carry manually, large cranes and other machinery are needed for loading and unloading, so that the loading and unloading cost is increased.

The issued Chinese utility model patent CN209536509U discloses a novel type loading and unloading device for wagon carriage cargo, wherein electrified loading and loading of the cargo is achieved by adopting driving devices, traveling devices and cargo loading devices. However, the loading and unloading device has usually a fixed platform height, and is generally flush with the carriage bottom. A forklift needs to raise and lower frequently when loading and unloading the cargo, resulting in safety problems and low loading and unloading efficiency.

SUMMARY

In view of the above issues, the purpose of the present disclosure is to provide a lifting type carriage cargo loading and unloading device, so as to improve the cargo loading and unloading efficiency and reduce the potential safety hazards.

To achieve the above purpose, the present disclosure adopts the following technical scheme.

The lifting type carriage cargo loading and unloading device in accordance with the present disclosure includes:

a frame including a cargo carrying platform, lifting oil cylinders and a supporting platform; the lifting oil cylinders are connected to both sides of the cargo carrying platform, the supporting platform is arranged on an upper surface of the cargo carrying platform, a lower surface of the supporting platform is provided with support columns, and the support columns are slidably penetrated into the cargo carrying platform and extend beyond a lower surface of the cargo carrying platform;

a cargo carrying mechanism, which is movably installed on the cargo carrying platform, and includes a push-and-pull assembly and at least two cargo carrying assemblies; and the at least two cargo carrying assemblies are arranged at intervals, each cargo carrying assembly is provided with an upper cover which is liftable, and the push-and-pull assembly is used for driving the upper cover to rise or restoring the upper cover; and a power mechanism installed on the cargo carrying platform or in the frame, and connected with the cargo carrying mechanism, so as to drive the cargo carrying mechanism to move along the cargo carrying platform; wherein the lifting oil cylinders drive the cargo carrying platform to move up and down, so that the supporting platform is flush with an upper surface of the upper cover or the supporting platform is lower than the upper surface of the upper cover.

Preferably, the lower surface of the cargo carrying platform is provided with multiple connecting cross beams, and a height of each support column is equal to a sum of a height of the cargo carrying platform, a height of one of the connecting cross beams and a height of the cargo carrying mechanism.

Preferably, ach cargo carrying assembly further includes a base and multiple lifting assemblies, the base is movably installed on the cargo carrying platform, the upper cover is covered on the base, the base is connected with the upper cover through the lifting assemblies, and the push-and-pull assembly is installed on the base.

Preferably, a lower surface of one end of the base away from the push-and-pull assembly is arc-shaped, and a lower surface and an upper surface of one end of the upper cover away from the push-and-pull assembly are both arc-shaped.

Preferably, both the upper cover and the base have channel steel structures, the base is embedded in a groove of the upper cover, and the lifting assemblies are installed between a groove bottom plate of the base and a groove bottom plate of the upper cover.

Preferably, each of the lifting assemblies includes a first lifting wheel and a first slope, the first lifting wheel is rotatably installed on the groove bottom plate of the upper cover, the first slope is arranged on the groove bottom plate of the base, the first slope is obliquely arranged upward from a front end of the base to a rear end of the base, and the push-and-pull assembly pushes and pulls the upper cover, so that the first lifting wheel moves along the first slope.

Preferably, each of the lifting assemblies includes a second slope and a third slope, the second slope is arranged on the groove bottom plate of the base, the second slope is obliquely arranged upward from a front end of the base to a rear end of the base, the third slope is arranged on the groove bottom plate of the upper cover, the third slope is obliquely arranged downward from a front end of the upper cover to a rear end of the upper cover, the push-and-pull assembly pushes and pulls the upper cover, and the third slope moves along the second slope.

Preferably, each of the lifting assemblies includes a first hinge seat, a second hinge seat and a first ejector rod, the first hinge seat is arranged on the groove bottom plate of the upper cover, the second hinge seat is arranged on the groove bottom plate of the base, one end of the first ejector rod is hinged with the first hinge seat, and an other end of the first ejector rod is hinged with the second hinge seat.

Preferably, the push-and-pull assembly includes push-and-pull rods, first push-and-pull oil cylinders, a first base connecting table and connecting rods, the first base connecting table is connected with each base, the connecting rods are arranged at intervals on upper sides of all the bases, each upper cover is hinged with one of the push-and-pull rods, an other end of each push-and-pull rod is hinged with one of the connecting rods, and each first push-and-pull oil cylinder has one end which is hinged on the first base connecting table, and an other end which is hinged on one of the connecting rods.

Preferably, each cargo carrying assembly further includes a push-and-pull plate, the push-and-pull plate is inserted in a covering space between the upper cover and the base, one end of the push-and-pull plate extends out of the upper cover in a groove length direction of the upper cover and is connected with the push-and-pull assembly, and multiple second lifting wheels are arranged at intervals on both sides of the push-and-pull plate; and each of the lifting assemblies includes a fourth slope, the fourth slope is in a two-piece type, the fourth slope is arranged on the groove bottom plate of the base and is obliquely arranged upward from a front end of the base to a rear end of the base, and the push-and-pull assembly pushes and pulls the push-and-pull plate and the upper cover, so that the second lifting wheels move along the fourth slope.

Preferably, each of the lifting assemblies further includes a fifth slope, the fifth slope is in a two-piece type, the fifth slope is arranged on the groove bottom plate of the upper cover and is obliquely arranged downward from a front end of the upper cover to a rear end of the upper cover; and the push-and-pull assembly pushes and pulls the push-and-pull plate, so that the second lifting wheels move along the fourth slope and the fifth slope.

Preferably, each cargo carrying assembly further includes a push-and-pull plate, the push-and-pull plate is inserted in a covering space between the upper cover and the base, one end of the push-and-pull plate extends out of the upper cover in a groove length direction of the upper cover and is connected with the push-and-pull assembly, multiple connections are arranged at intervals on both sides of the push-and-pull plate, each of the lifting assemblies includes a third hinge seat fixed on the upper cover and a fourth hinge seat fixed on the base, each connection includes two second ejector rods, one end of each of the two second ejector rods is hinged with the push-and-pull plate, and the other ends of the two second ejector rods are respectively hinged with the third hinge seat and the fourth hinge seat.

Preferably, the push-and-pull assembly includes a second push-and-pull oil cylinder, a push-and-pull plate connecting table and a second base connecting table, the push-and-pull plate connecting table is connected with each push-and-pull plate, the second base connecting table is connected with each base, and the second push-and-pull oil cylinder has one end which is hinged on the push-and-pull plate connecting table, and an other end which is hinged on the second base connecting table.

Preferably, the push-and-pull assembly also includes limited connecting rods, first limited blocks and second limited blocks, each upper cover is provided with one of the first limited blocks, multiple second limited blocks are arranged at intervals on the second base connecting table, set positions of the second limited blocks correspond to those of the first limited blocks, respectively, each limited connecting rod is arranged on upper side of the corresponding base in parallel, and each limited connecting rod has one end which is hinged on a corresponding one of the first limited blocks, and an other end which is hinged on a corresponding one of the second limited blocks.

Preferably, the power mechanism includes traction chain wheels, a traction chain and a first traction reducer, both of the traction chain wheels are respectively installed in a front side and a rear side of the cargo carrying platform, the traction chain is installed on said both of the traction chain wheels, the first traction reducer is installed on the rear side of the cargo carrying platform and connected with the traction chain wheel installed on the rear side of the cargo carrying platform, the traction chain is provided with a first connecting block, and the first connecting block is connected with the cargo carrying mechanism.

Preferably, the power mechanism includes traveling racks, traveling gears, a connecting shaft and a second traction reducer, the traveling racks are installed in the cargo carrying platform, the connecting shaft is arranged in the cargo carrying platform, both ends of the connecting shaft are respectively connected with one of the traveling gears, each traveling gear is meshed with a corresponding one of the traveling racks, the connecting shaft is connected with a second connecting block through a bearing seat, and the second connecting block is connected with the cargo carrying mechanism; and a transmission gear is sleeved on the connecting shaft, the second traction reducer is arranged on the cargo carrying mechanism, and the second traction reducer is in transmission connection with the transmission gear.

Preferably, the power mechanism includes a third traction reducer, a steel wire rope sheave and fixed pulleys, the third traction reducer and the steel wire rope sheave are both installed in the cargo carrying platform, the third traction reducer is in transmission connection with the steel wire rope sheave, one of the fixed pulleys is respectively installed in the front side and the rear side of the cargo carrying platform, and both ends of a steel wire rope on the steel wire rope sheave are each connected to the cargo carrying mechanism around a corresponding one of the fixed pulleys.

Preferably, an oil cylinder synchronization mechanism is installed between the lifting oil cylinders arranged on both sides of the cargo carrying platform, the oil cylinder synchronization mechanism includes a synchronization cross bar, both ends of the synchronization cross bar are respectively connected with a corresponding one of the lifting oil cylinders, two synchronization racks are vertically arranged on the synchronization cross bar, and slot holes for accommodating the synchronization racks are formed in the frame; and a synchronization shaft is rotatably arranged in the frame, both ends of the synchronization shaft are respectively provided with a synchronization gear, and each synchronization gear is respectively meshed and connected with a corresponding one of the synchronization racks.

Preferably, the push-and-pull assembly is plural in number, each cargo carrying assembly is respectively connected with one of the push-and-pull assemblies, and an interval between the two cargo carrying assemblies is adjustable.

Preferably, one end of each cargo carrying assembly connected with said one of the push-and-pull assemblies is provided with a connecting column, one end of each push-and-pull assembly connected with a corresponding one of the cargo carrying assemblies is provided with a connecting sleeve, the connecting column is slidably arranged inside the connecting sleeve, and an end of the connecting column is connected with a pushing mechanism for pushing the connecting column; and multiple liftable rollers are arranged on each cargo carrying assembly at intervals, and a central axis of each liftable roller is parallel to a length direction of the corresponding one of the cargo carrying assemblies.

Preferably, positioning strips are arranged at intervals on the cargo carrying platform, the positioning strips are arranged extending along a length direction of the cargo carrying platform, and each positioning strip is used for defining a moving position of the corresponding one of the cargo carrying assemblies in a width direction thereof.

Preferably, multiple liftable moving wheels are installed on the sides of the cargo carrying platform.

Preferably, connecting plates are fixed on the sides of the cargo carrying platform, a sleeve is fixed on each connecting plate, a moving wheel connecting rod penetrating through an interior of the sleeve is arranged on each liftable moving wheel, and the moving wheel connecting rod is detachably connected with the sleeve.

Preferably, multiple direction markers are uniformly and circumferentially arranged in an upper part of the moving wheel connecting rod.

Compared with the prior art, the lifting type carriage cargo loading and unloading device in accordance with the present disclosure has the following beneficial effects.

According to the lifting type carriage cargo loading and unloading device in the present disclosure, the cargo carrying platform is lowered to the ground through the lifting oil cylinders, so that the support columns stand on the ground. The supporting platform is jacked up by the support columns, so that the supporting platform is flush with the upper surface of the upper cover. By means of a transportation mechanism such as a forklift forked in a bottom space of the cargo carrier, the cargo on the carrier is transported to the cargo carrying mechanism, and legs of the cargo carrier stand on the supporting platform. The above operation is repeated until loading of the cargo is completed. The cargo carrying platform is jacked up through the lifting oil cylinders, and the cargo carrying platform is elevated to the same height as a wagon carriage, so that the cargo carrying platform is aligned with the wagon carriage. When the cargo carrying platform rises, the supporting platform falls accordingly in the meantime. The push-and-pull assembly is started, and the upper cover is driven to rise through the push-and-pull assembly, so that the legs of the cargo carrier are separated from the supporting platform, and the cargo is carried by the cargo carrying mechanism. The power mechanism is started to draw the cargo carrying mechanism to travel into the carriage. When the cargo completely enters the carriage, the push-and-pull assembly is started in the opposite direction, the upper cover falls immediately therewith, and the carrier of the cargo falls on a bottom surface of the carriage. At this time, the power mechanism is started again, and the cargo carrying mechanism is retracted, and the cargo is loaded into the carriage at one time. During unloading, the cargo can be transferred to the cargo carrying mechanism by reverse operation and transported out of the carriage at one time without manual handling, so that the efficiency is improved, and the labor cost is reduced. During cargo loading and unloading, the cargo carrying platform is placed on the ground, so that the overall height is reduced, the working height of the forklift is greatly reduced, the forklift does not need to lift frequently, the working intensity is decreased, the loading and unloading efficiency is improved, and the working safety is also improved. Because the supporting platform structure is provided, when the cargo carrying platform is placed on the ground, the supporting platform can be raised to the same height as the upper cover. Such arrangement facilitates the entry and exit of a forklift arm, so that the friction interference between the forklift arm and a surface of the upper cover is reduced. The heights of carrier legs can be further reduced because no space for the thickness of the forklift arm is reserved, and further the loading capacity of the cargo is increased.

7

Figures 27, 28:
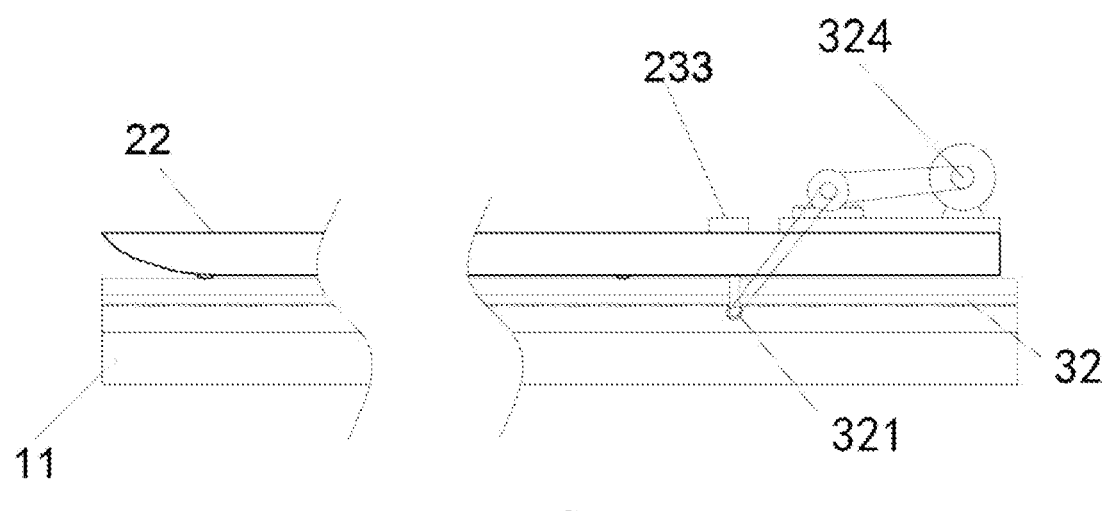
FIG. 27 is a schematic side structural diagram of a base and the second power mechanism in the present disclosure.
Figure 29:
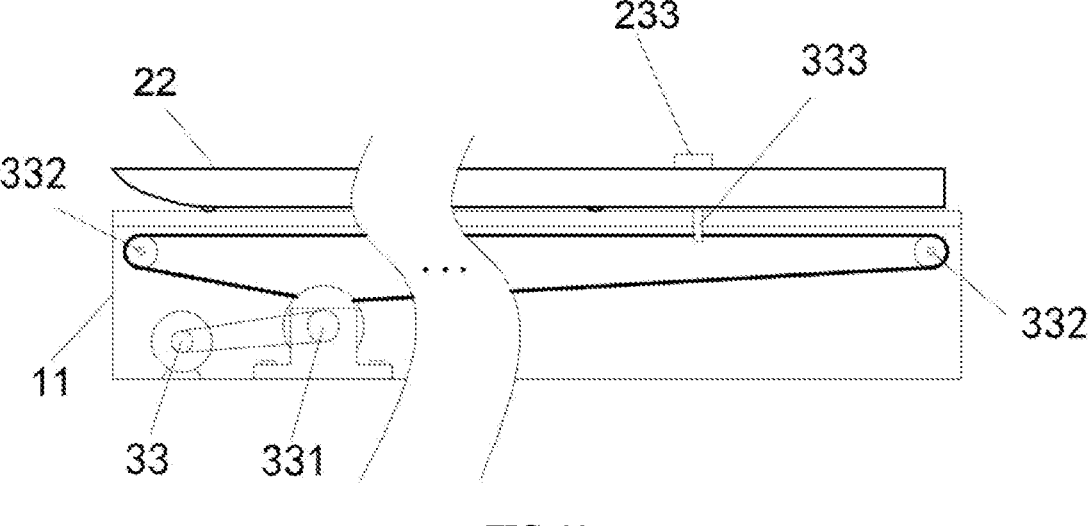
Figure 30:
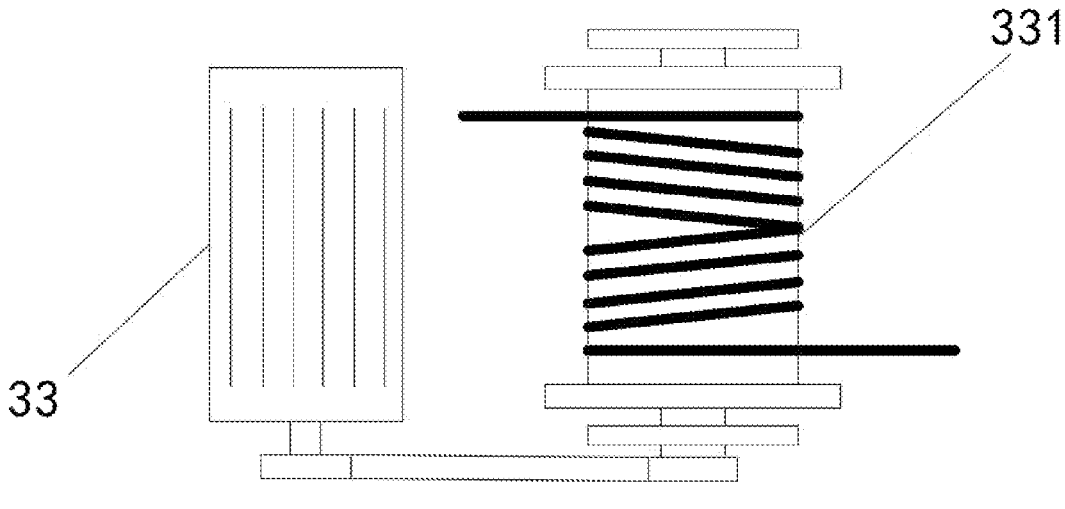
Figure 31:
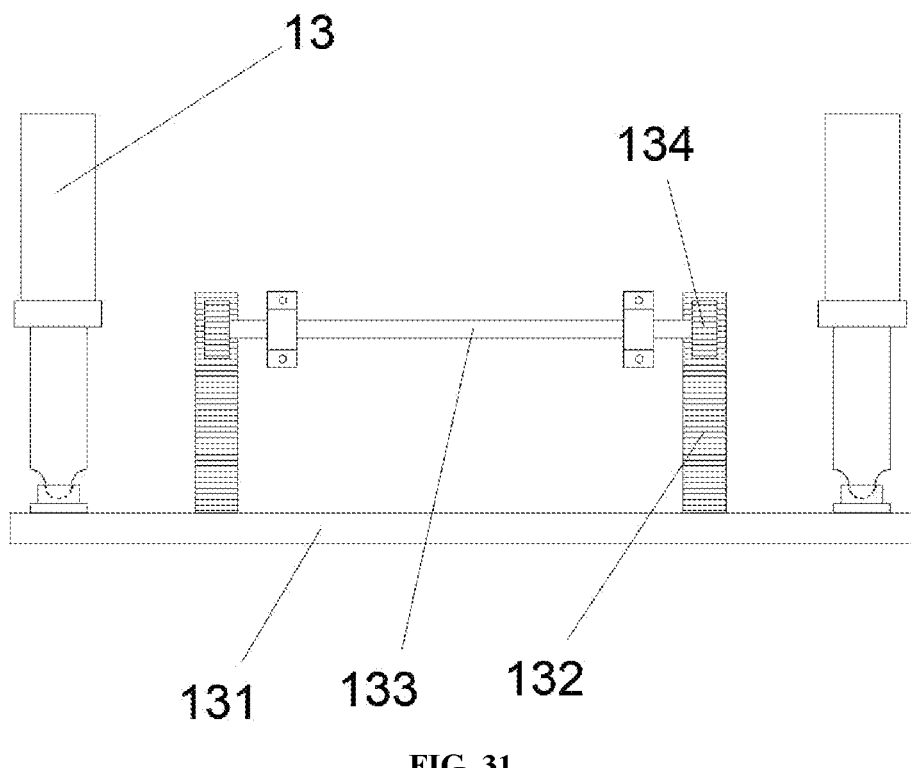
Figure 32:
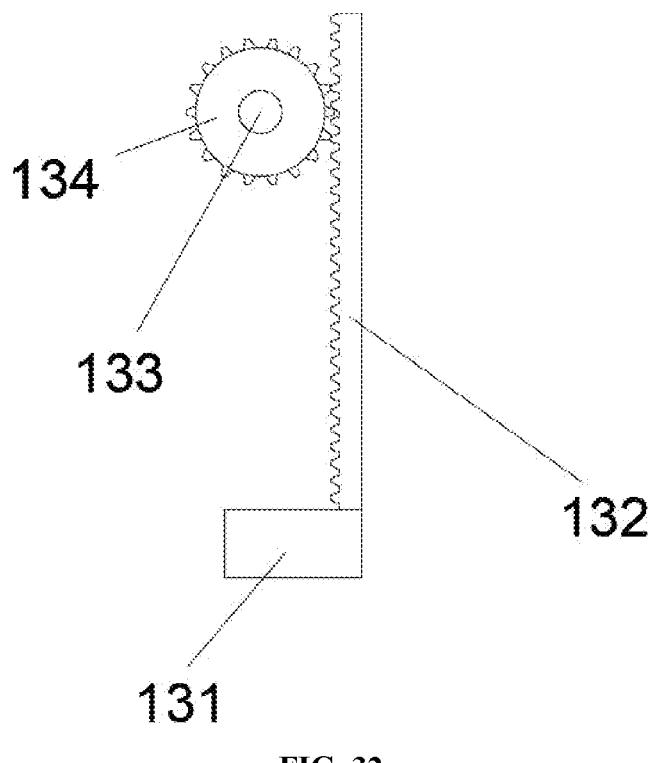
Figure 33:
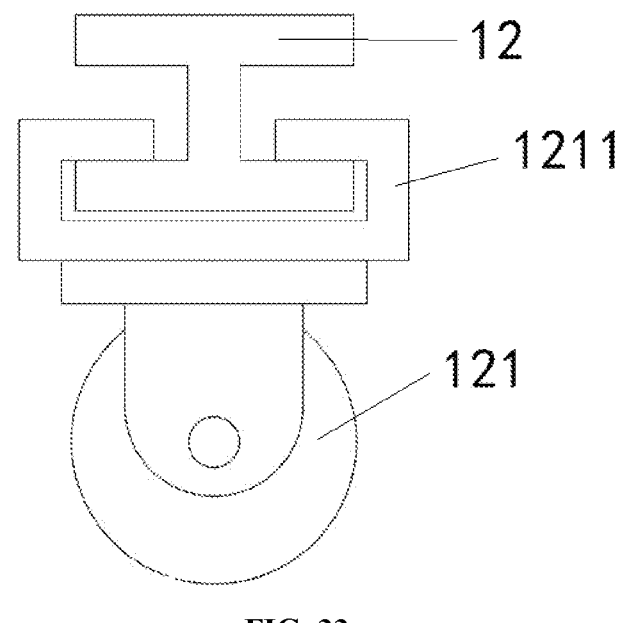
Figure 34:
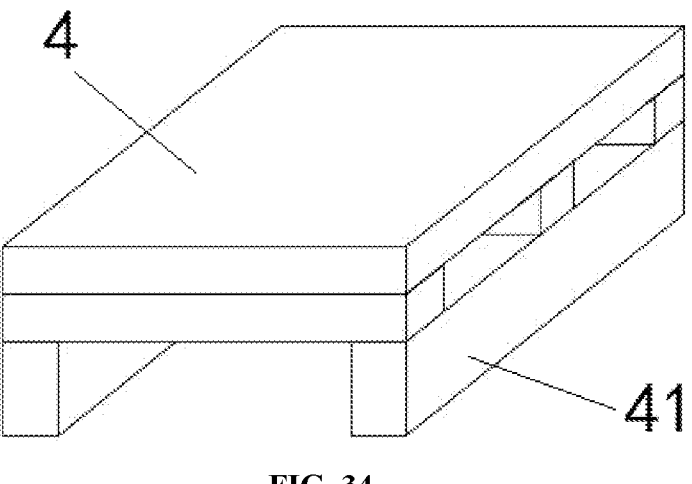
Figure 35:
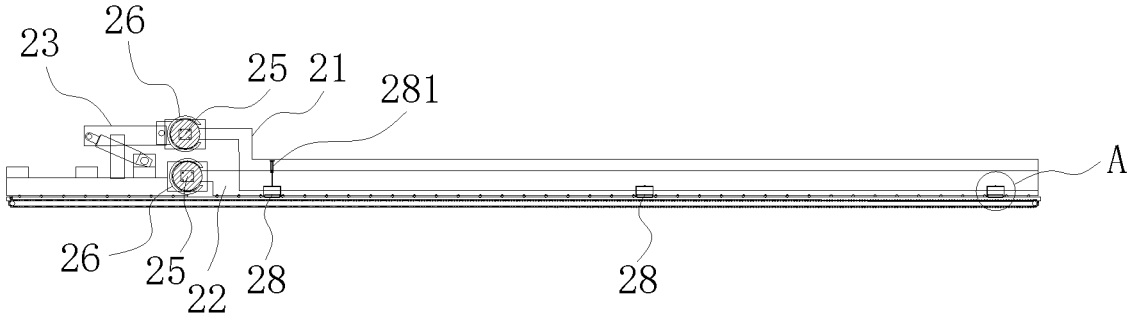
Figure 36:
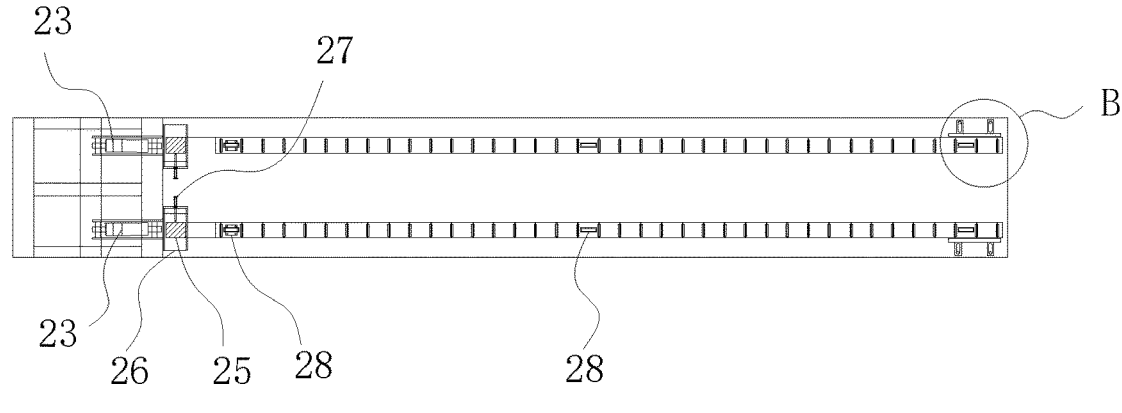
Figure 37:
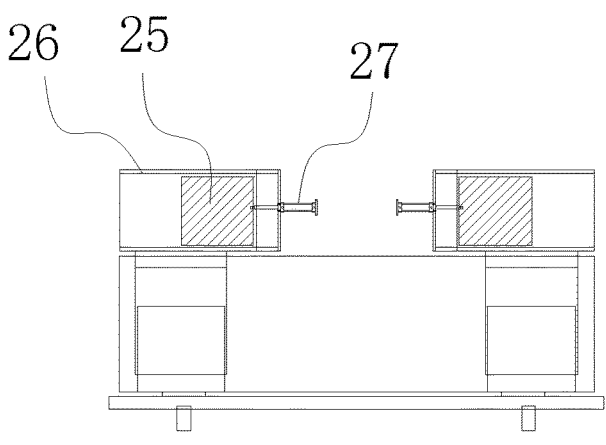
Figure 38:
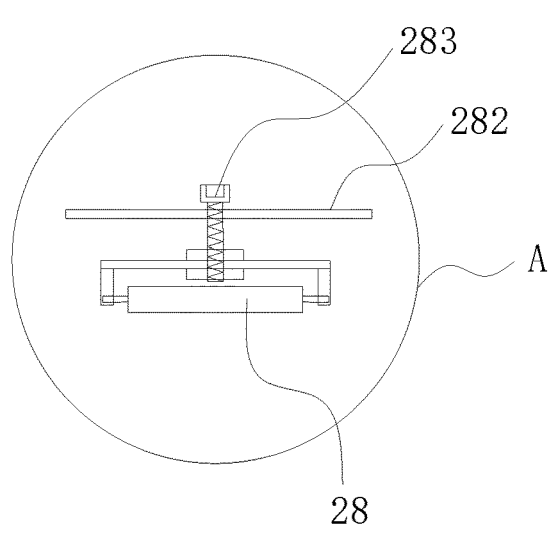
Figure 39:
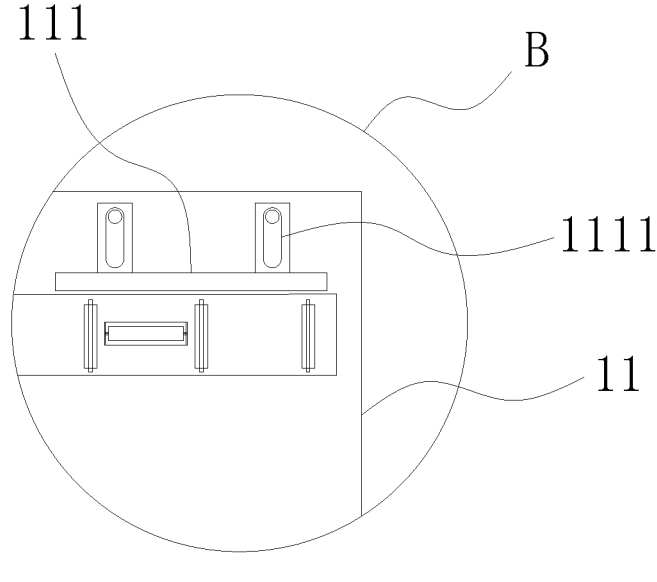
Figure 40:
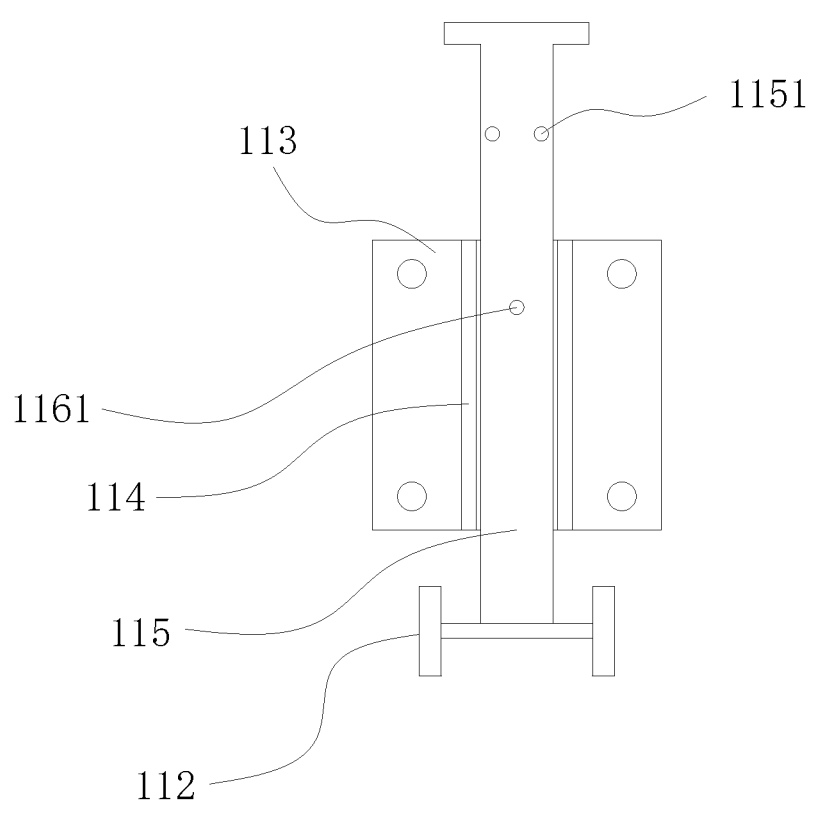
Figure 41:
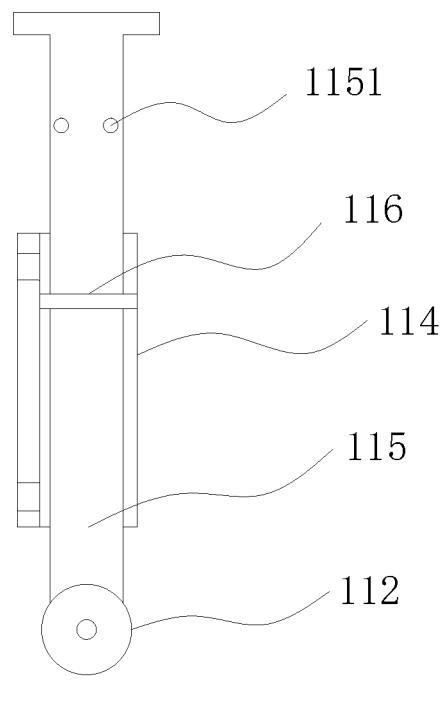

FIG. 28 is a schematic structural diagram of a third power mechanism in the present disclosure;

FIG. 29 is a schematic side structural diagram of a base and the third power mechanism in the present disclosure;

FIG. 30 is a top view of a third traction reducer and a steel wire rope sheave in the present disclosure;

FIG. 31 is a schematic structural diagram of an oil cylinder synchronization mechanism in the present disclosure;

FIG. 32 is a schematic side structural diagram of the oil cylinder synchronization mechanism in the present disclosure;

FIG. 33 is an assembly diagram of a universal wheel and a connecting cross beam in the present disclosure;

FIG. 34 is a structural diagram of a cargo carrier applicable to the present disclosure;

FIG. 35 is a schematic front structural view of two cargo carrying assemblies with an adjustable interval therebetween in the present disclosure;

FIG. 36 is a schematic top structural view of two cargo carrying assemblies with an adjustable interval therebetween in the present disclosure;

FIG. 37 is a schematic side structural view of two cargo carrying assemblies with an adjustable interval therebetween in the present disclosure;

FIG. 38 is a local enlarged schematic diagram of part A in FIG. 35;

FIG. 39 is a local enlarged schematic diagram of part B in FIG. 36;

FIG. 40 is a schematic installation structural diagram of a liftable moving wheel in the present disclosure; and FIG. 41 is an installation structural side view of a liftable moving wheel in the present disclosure.

REFERENCE NUMERALS 1, frame; 11, cargo carrying platform; 111, positioning strip; 1111, elongated slot; 112, liftable moving wheel; 113, connecting plate; 114, sleeve; 115, moving wheel connecting rod; 1151, direction marker; 116, pin; 1161, pin hole; 12, connecting cross beam; 121, universal wheel; 1211, fixed clamping groove; 13, lifting oil cylinder; 131, synchronization cross bar; 132, synchronization rack; 133, synchronization shaft; 134, synchronization gear; 14, supporting platform; 141, support column;
2, cargo carrying mechanism; 21, upper cover; 211, first lifting wheel; 212, third slope; 213, first hinge seat; 214, fifth slope; 215, third hinge seat; 22, base; 221, traveling wheel; 222, first slope; 223, second slope; 224, second hinge seat; 225, first ejector rod; 226, fourth slope; 227, fourth hinge seat; 23, push-and-pull assembly; 231, push-and-pull rod; 232, first push-and-pull oil cylinder; 233, first base connecting table; 234, connecting rod; 235, second push-and-pull oil cylinder; 236, push-and-pull plate connecting table; 237, second base connecting table; 238, limited connecting rod; 2381, first limited block; 2382, second limited block; 24, push-and-pull plate; 241, second lifting wheel; 242, second ejector rod; 25, connecting column; 26, connecting sleeve; 27, pushing mechanism; 28, liftable roller; 281, roller adjusting oil cylinder; 282, fixed plate; 283, screw;
3, power mechanism; 31, traction chain wheel; 311, traction chain; 312, first connecting block; 313, first traction reducer; 32, traveling rack; 321, traveling gear; 322, connecting shaft; 323, second connecting block; 324, second traction reducer; 325, transmission gear; 33, third traction reducer; 331, steel wire rope sheave; 332, fixed pulley; 333, third connecting block;
4, cargo carrier; 41, leg.

DETAILED DESCRIPTION OF THE EMBODIMENTS

In the description of the present disclosure, it needs to be illustrated that, unless otherwise specified and defined explicitly, the terms such as "install", "link" and "connect" should be understood in a broad sense, for example, the components can be fixedly connected, and can also be detachably connected or integrally connected; the components can be mechanically connected, and can also be electrically connected; the components can be directly connected, and also can be indirectly connected through an intermediate, and two components can be communicated internally. For those skilled in the art, the specific meanings of the terms in the present disclosure can be understood according to specific conditions.

The description of specific embodiments in the present disclosure is further described in detail in conjunction with the following accompanying drawings and embodiments. The following embodiments are used for illustrating the present disclosure, but are not used for restricting the scope of the present disclosure.

As shown in FIG. 1 to FIG. 34, a lifting type carriage cargo loading and unloading device in accordance with the present embodiment is used for loading and unloading cargo, and the cargo is carried by a cargo carrier 4. The lifting type carriage cargo loading and unloading device includes a frame 1, a cargo carrying mechanism 2 and a power mechanism 3. The frame 1 includes a cargo carrying platform 11, lifting oil cylinders 13 and a supporting platform 14. The lifting oil cylinders 13 are connected to both sides of the cargo carrying platform 11 and used for driving the cargo carrying platform 11 to move up and down and adjusting the height position of the cargo carrying platform 11. The supporting platform 14 is arranged on an upper surface of the cargo carrying platform 11. A lower surface of the supporting platform 14 is provided with support columns 141. The support columns 141 are slidably penetrated into the cargo carrying platform 11 and extend beyond a lower surface of the cargo carrying platform 11. Multiple support columns 141 are arranged, and the support columns 141 are distributed on the lower side of the supporting platform 14 and used for supporting the supporting platform 14. The cargo carrying mechanism 2 is movably installed on the cargo carrying platform 11 and can translate along the cargo carrying platform 11. The cargo carrying mechanism 2 includes a push-and-pull assembly 23 and at least two cargo carrying assemblies. The at least two cargo carrying assemblies are arranged at intervals. Each cargo carrying assembly is provided with an upper cover 21 which is liftable. The push-and-pull assembly 23 is used for driving the upper cover 21 to rise so as to facilitate to support cargo through the upper cover 21, or restoring the upper cover 21. The power mechanism 3 is installed on the cargo carrying platform 11 or inside the frame 1, and is connected with the cargo carrying mechanism 2 so as to drive the cargo carrying mechanism 2 to move along the cargo carrying platform 11. The lifting oil cylinders 13 drive the cargo carrying platform 11 to move up and down, so that the supporting platform 14 is flush with an upper surface of the upper cover 21 or the supporting platform 14 is lower than the upper surface of the upper cover 21. When the supporting platform 14 is flush with the upper surface of the upper cover 21, the supporting platform 14 and the upper cover 21 jointly carry the cargo; and when the supporting platform 14 is lower than the upper surface of the upper cover 21, the cargo is carried by the upper cover 21.

The cargo carrying platform 11 is lowered to the ground through the lifting oil cylinders 13, so that the supporting columns 141 stand on the ground. The supporting platform 14 is jacked up through the support columns 141, so that the supporting platform 14 is flush with the upper surface of the upper cover 21. The cargo on the carrier is transported onto the cargo carrying mechanism 2 in such a way that a transportation mechanism such as a forklift is forked into a bottom space of the cargo carrier 4. And legs 41 of the cargo carrier 4 stand on the supporting platform 14. The above procedure is repeated until loading of the cargo is completed. The cargo carrying platform 11 is jacked up through the lifting oil cylinders 13 until the cargo carrying platform 11 is raised to the same height as a wagon carriage, so that the cargo carrying platform 11 is aligned with the wagon carriage. While the cargo carrying platform 11 rises, the supporting platform 14 falls accordingly therewith. The push-and-pull assembly 23 is started, and the upper cover 21 is driven to rise through the push-and-pull assembly 23, so that the legs 41 of the cargo carrier 4 are separated from the supporting platform 14, and the cargo is carried by the cargo carrying mechanism 2. The power mechanism 3 is started to pull the cargo carrying mechanism 2 to travel into the carriage. When the cargo completely enters the carriage, the push-and-pull assembly 23 is started in the opposite direction, the upper cover 21 falls down immediately, and the carrier of the cargo also falls on a bottom surface of the carriage. At this time, the power mechanism 3 is started again, and the cargo carrying mechanism 2 is retracted, so that the cargo is loaded into the carriage at one time. During unloading, by reverse operation, the cargo can be transferred onto the cargo carrying mechanism 2 and transported out of the carriage at one time without manual handling, so that the efficiency is improved, and the labor cost is reduced. During cargo loading and unloading, the cargo carrying platform 11 is placed on the ground, so that the overall height is reduced, the working height of the forklift is greatly reduced, the forklift does not need to move up or move down frequently, the working intensity is reduced, the loading and unloading efficiency is improved, and the working safety is also improved. Since the supporting platform structure is provided, when the cargo carrying platform 11 is placed on the ground, the supporting platform 14 can be raised to the same height as the upper cover 21. Such arrangement facilitates the entry and exit of a forklift arm, so that the friction interference between the forklift arm and a surface of the upper cover 21 is reduced, the heights of carrier legs can be further shortened because no space for the thickness of the forklift arm need to be reserved, and then the loading capacity of the cargo is increased.

In order to ensure that the cargo carrying mechanism 2 translates along a straight line on the cargo carrying platform 11, optionally, guide strips are arranged on the cargo carrying platform 11, and the movement of the cargo carrying mechanism 2 is guided through the guide strips.

Figure 2:
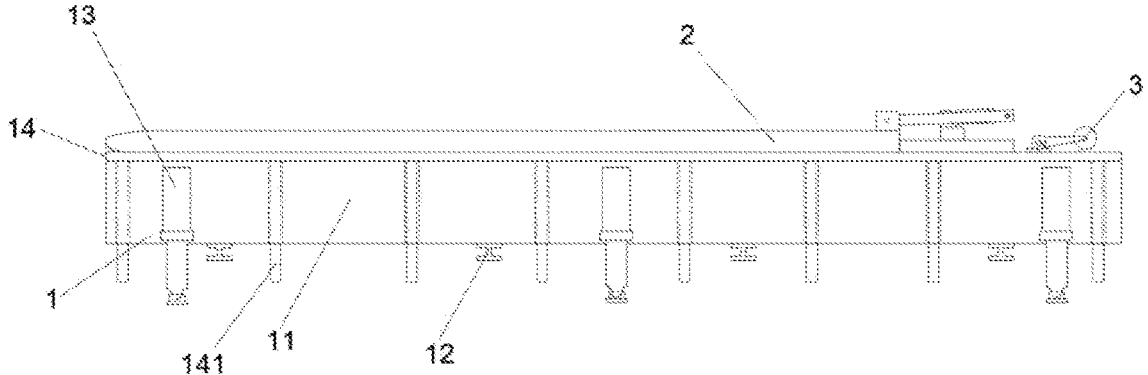
FIG. 2 is a side view of a lifting type carriage cargo loading and unloading device in accordance with the present disclosure.
Figure 3:
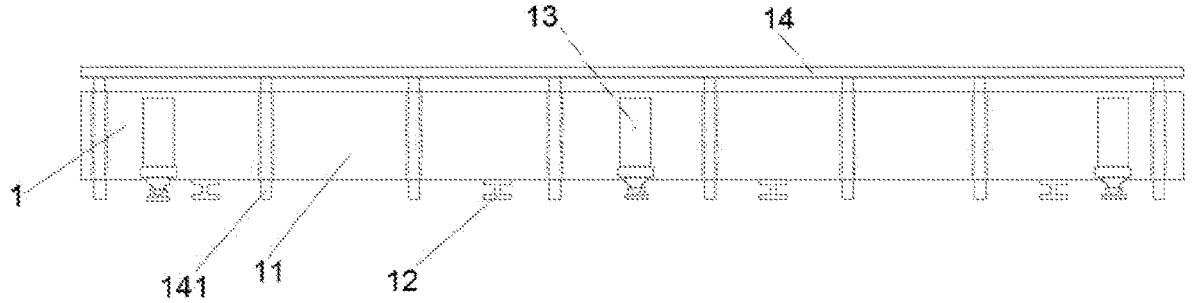
FIG. 3 is a schematic state diagram of a cargo carrying platform lowered to the lowest height in FIG. 2.
Figure 4:
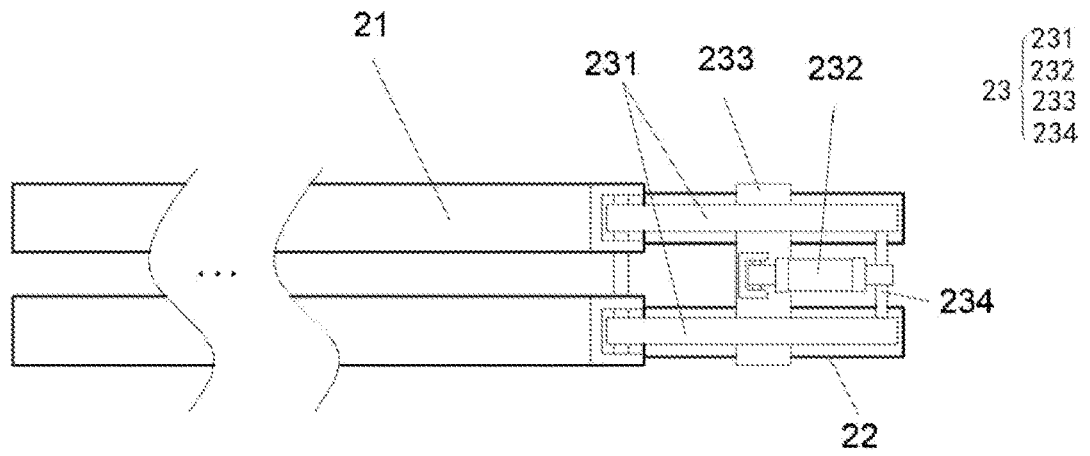
FIG. 4 is a top view of a cargo carrying mechanism in a first embodiment of the present disclosure.
Figure 5:
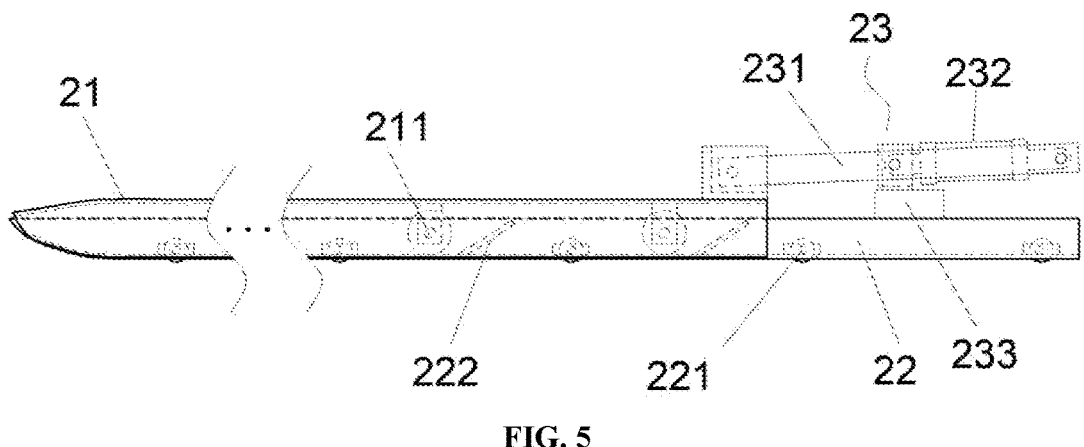
FIG. 5 is a side view of the cargo carrying mechanism in the first embodiment of the present disclosure.
Figure 6:
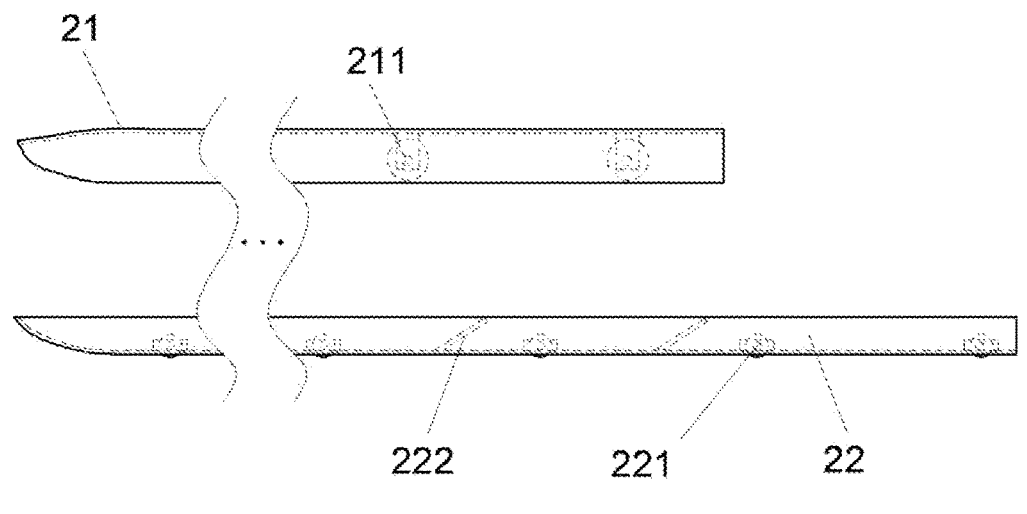
FIG. 6 is a schematic separated structural diagram of an upper cover and a base in FIG. 5 in the present disclosure.
Figure 7:
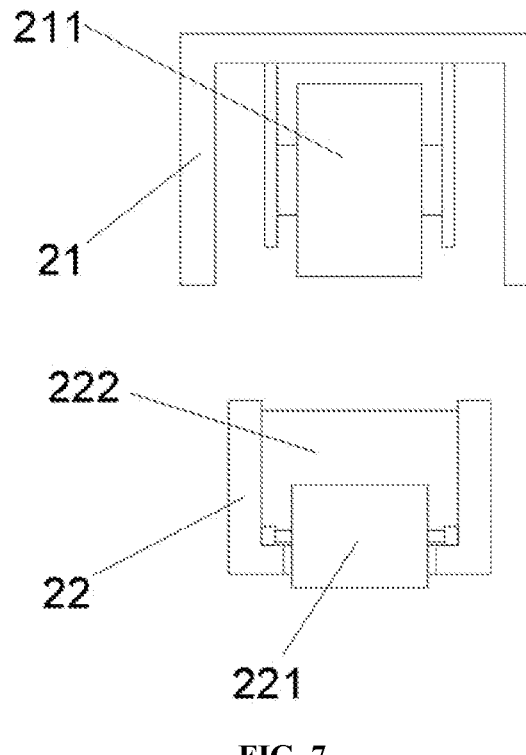
FIG. 7 is a schematic internal structural diagram of cross sections of the upper cover and the base in the first embodiment of the present disclosure.

Optionally, as shown in FIG. 2 and FIG. 3, the lower surface of the cargo carrying platform 11 is provided with multiple connecting cross beams 12, and the length direction of each connecting cross beam 12 is arranged parallel to the width direction of the cargo carrying platform 11. The height of each support column 141 is equal to the sum of the height of the cargo carrying platform 11, the height of the connecting cross beam 12 and the height of the cargo carrying mechanism 2. When the lifting oil cylinders 13 drive the cargo carrying platform 11 to lower to the ground, the connecting cross beams 12 are in contact with the ground, and the connecting cross beams 12 support the cargo carrying platform 11 to prevent the cargo carrying platform 11 from being directly placed on the ground to rub against the ground and damage the surface of the cargo carrying platform 11. At this time, the supporting platform 14 is supported by the support columns 141, so that the upper surface of the supporting platform 14 is flush with the upper surface of the upper cover 21 of the cargo carrying mechanism 2, and the cargo carrier 4 and the cargo on the cargo carrier 4 are jointly supported by the supporting platform 14 and the cargo carrying mechanism 2.

Further, as shown in FIG. 33, each connecting cross beam 12 is an I-shaped beam with an I-shaped cross section. The lower side of each connecting cross beam 12 is provided with a universal wheel 121. A fixed clamping groove 1211 is formed at the top of the universal wheel 121. The fixed clamping groove 1211 is detachably connected with the connecting cross beam 12. The connecting cross beam 12 is designed in the form of an I-beam to facilitate the installation of the fixed clamping groove 1211, such that it is convenient to assemble and disassemble the universal wheel 121 at the lower side of the connecting cross beam 12. The universal wheel is detachable for adjusting the position before cargo loading and unloading, and can be detached after adjustment, so that the connecting cross beams 12 of the cargo carrying platform 11 are more stably seated on the ground for cargo loading and unloading operation.

A cylinder of the lifting oil cylinder 13 is fixed on a side of the cargo carrying platform 11, and a telescopic arm extends downward, and a tail end of the telescopic arm is connected with a universal ball flange. The universal ball flange can ensure stable supporting force for the cargo carrying platform even on an uneven bottom surface.

Preferably, as shown in FIG. 31 and FIG. 32, an oil cylinder synchronization mechanism is installed between the telescopic arms of the lifting oil cylinders 13 on both sides of the cargo carrying platform 11, which can ensure synchronous lifting of the telescopic arms of the lifting oil cylinders to maintain the stability of the whole equipment. The oil cylinder synchronization mechanism includes a synchronization cross bar 131. The length direction of the synchronization cross bar 131 is parallel to the width direction of the cargo carrying platform 11. Both ends of the synchronization cross bar 131 are respectively connected with a corresponding one of the lifting oil cylinders 13. Two synchronization racks 132 are vertically arranged on the synchronization cross bar 131, and slot holes for accommodating the synchronization racks 132 are formed in the frame 1. A synchronization shaft 133 is rotatably arranged in the frame 1. The synchronization shaft 133 is arranged in the frame 1 through a bearing seat, and both ends of the synchronization shaft 133 extend out of the bearing seat. The synchronization shaft 133 is arranged on the upper side of the synchronization cross bar 131 in parallel. Both ends of the synchronization shaft 133 are respectively provided with a synchronization gear 134, and each synchronization gear 134 is respectively meshed and connected with a corresponding one of the synchronization racks 132. When one of the lifting oil cylinders 13 drives the cargo carrying platform 11 to move up and down, the synchronization cross bar 131 moves up and down synchronously. The synchronization cross bar 131 drives the synchronization rack 132 to move up and down. The synchronization rack 132 drives the corresponding synchronization gear 134 to rotate. The synchronization gear 134 drives the synchronization shaft 133 to rotate. The synchronization shaft 133 drives the other synchronization gear 134 to rotate, so that the other synchronization rack 132 moves up and down, and the other synchronization rack 132 drives the lifting oil cylinder 13 on the other side to move up and down. Therefore, it is ensured that the lifting oil cylinders 13 on both sides drive the cargo carrying platform 11 to move up and down synchronously, so that the surface of the cargo carrying platform 11 remains horizontal, and the cargo on the surface of the cargo carrying platform 11 is prevented from toppling over.

Figure 1:
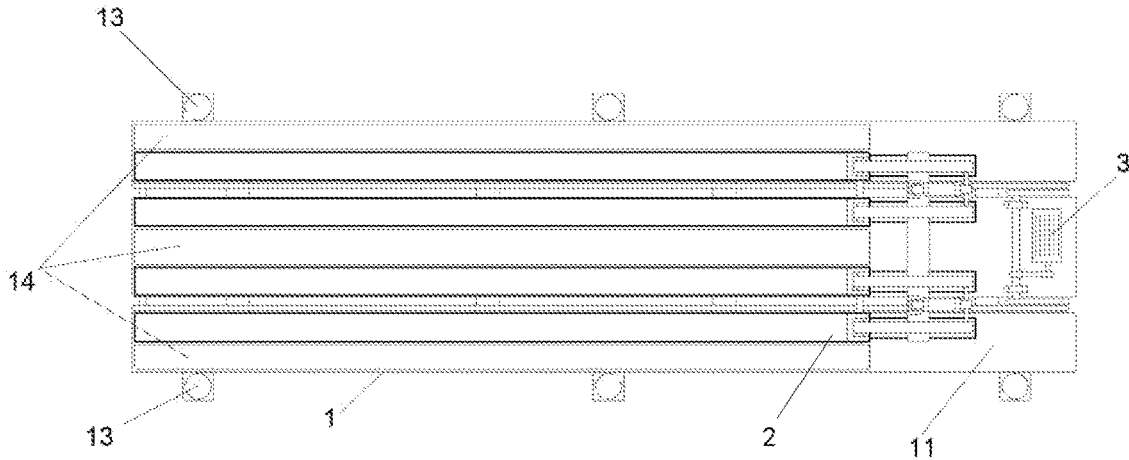
FIG. 1 is a top view of a lifting type carriage cargo loading and unloading device in accordance with the present disclosure.

In the embodiment, as shown in FIG. 1, at least two cargo carrying assemblies are arranged at intervals. Supporting platforms 14 and corresponding support columns 141 are arranged on both sides of the cargo carrying assemblies and between two adjacent cargo carrying assemblies to provide balanced supporting force to a cargo carrier.

The structure of each cargo carrying assembly is basically the same, and the structure of only one cargo carrying assembly is taken as an example for illustration. The cargo carrying assembly also includes a base 22 and multiple lifting assemblies. The base 22 is movably installed on the cargo carrying platform 11. The upper cover 21 is covered on the base 22. The base 22 is connected with the upper cover 21 through the lifting assemblies, so that the upper cover 21 can move up and down relative to the base 22. The push-and-pull assembly 23 is installed on the base 22. In the process that the push-and-pull assembly 23 push and pull the upper cover 21 to move along the base 22, the upper cover 21 moves up and down relative to the base 22. Further, traveling wheels 221 are distributed on the base 22, and each traveling wheels 221 is fixed to the base 22 through a bearing seat and protrudes from a through hole formed in the bottom of the base 22 to contact with the cargo carrying platform.

Further, a lower surface of one end of the base 22 away from the push-and-pull assembly 23 is arc-shaped, and a lower surface and an upper surface of one end of the upper cover 21 away from the push-and-pull assembly 23 are both arc-shaped. After the base 22 is covered with the upper cover 21, upper and lower surfaces of one end, away from the push-and-pull assembly 23, of an integral structure formed by the upper cover 21 and the base 22 have curvatures, so that the integral structure formed by the upper cover 21 and the base 22 is conveniently inserted into the bottom of the cargo carrier 4 when the cargo is loaded and unloaded.

Preferably, both the upper cover 21 and the base 22 have channel steel structures. A notch of a groove of the upper cover 21 is arranged downward, and a notch of a groove of the base 22 is arranged upward. The base 22 is embedded in the groove of the upper cover 21. The lifting assemblies are installed between a groove bottom plate of the base 22 and a groove bottom plate of the upper cover 21, so that the occupied space of the upper cover 21 and the base 22 is reduced.

In the present embodiment, the lifting assemblies can be carried out in various structural forms, as long as the lifting of the upper cover 21 relative to the base 22 can be realized during the translation of the upper cover 21 along the base 22.

Optionally, as shown in FIG. 4 to FIG. 7, the lifting assembly includes a first lifting wheel 211 and a first slope 222. The first lifting wheel 211 is rotatably installed on the groove bottom plate of the upper cover 21. The first slope 222 is arranged on the groove bottom plate of the base 22. The first slope 222 is obliquely arranged upward from a front end of the base 22 towards a rear end of the base 22, in which the front end is one end away from the push-and-pull assembly 23, and the rear end is one end at which the push-and-pull assembly 23 is arranged. The first slope 222 is arranged between the two adjacent traveling wheels. The push-and-pull assembly 23 pushes and pulls the upper cover 21, so that the first lifting wheel 211 moves along the first slope 222. The distribution position of each first lifting wheel 211 corresponds to that of the respective first slope 222 up and down. Because the first slope 222 is obliquely arranged upward, when the push-and-pull assembly 23 pulls the upper cover 21, the first lifting wheel 211 moves along the first slope 222, and the height position of the first lifting wheel 211 is gradually elevated, so that the upper cover 21 rises up therewith. When the push-and-pull assembly 23 pushes the upper cover 21, the first lifting wheel 211 moves in the opposite direction along the first slope 222, and the height position of the first lifting wheel 211 is gradually lowered, so that the upper cover 21 falls therewith. By adopting the structural forms of the first lifting wheel 211 and the first slope 222, the friction force between the first lifting wheel 211 and the first slope 222 can be reduced, so that the upper cover 21 can move smoothly along the base 22, and moreover, the structure is simple, and the fabrication and processing are convenient.

Figure 8:
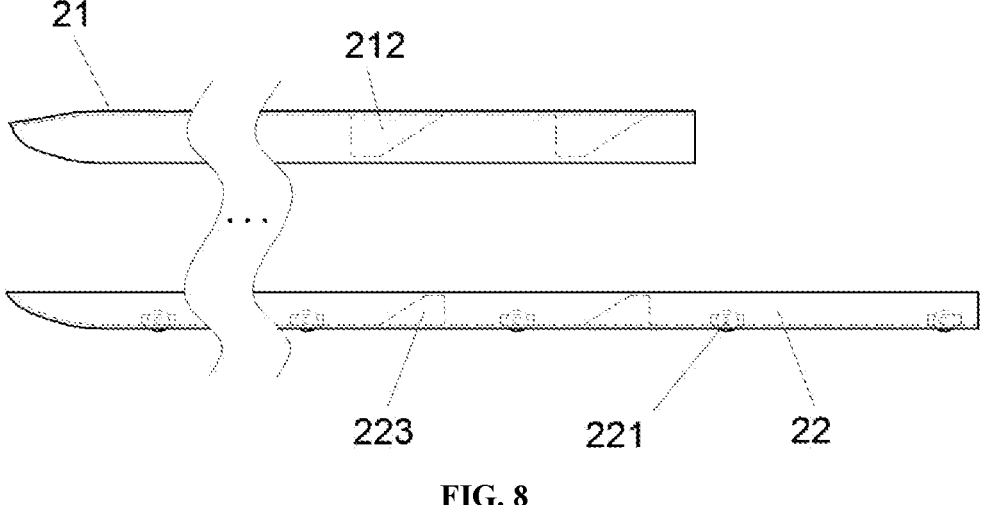
FIG. 8 is a schematic separated structural diagram of an upper cover and a base in a second embodiment of the present disclosure.
Figure 9:
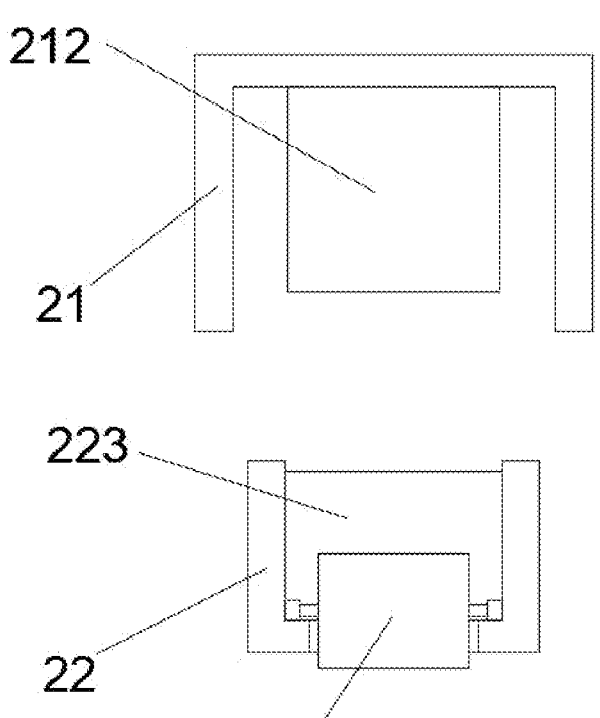
FIG. 9 is a schematic internal structural diagram of cross sections of the upper cover and the base in the second embodiment of the present disclosure.

Optionally, as shown in FIG. 8 and FIG. 9, the lifting assembly includes a second slope 223 and a third slope 212. The second slope 223 is arranged on the groove bottom plate of the base 22. The second slope 223 is obliquely arranged upward from the front end of the base 22 towards the rear end of the base 22. The third slope 212 is arranged on the groove bottom plate of the upper cover 21. The third slope 212 is obliquely arranged downward from a front end of the upper cover 21 towards a rear end of the upper cover 21. The push-and-pull assembly 23 pushes and pulls the upper cover 21, and the third slope 212 moves along the second slope 223. The slope surface gradient of the third slope 212 is adapted to that of the second slope 223, so that a slope surface of the third slope 212 and a slope surface of the second slope 223 can be completely fitted. When the push-and-pull assembly 23 pulls the upper cover 21, the upper cover 21 moves along the base 22, the third slope 212 moves along the second slope 223, and the height position of the third slope 212 gradually is elevated, so that the upper cover 21 is moved up relative to the base 22. When the push-and-pull assembly 23 pushes the upper cover 21 in the opposite direction, the upper cover 21 moves in the opposite direction along the base 22, the third slope 212 moves from bottom to top along the second slope 223, and the height position of the third slope 212 gradually is lowered, so that the upper cover 21 is moved down relative to the base 22.

Figure 10:
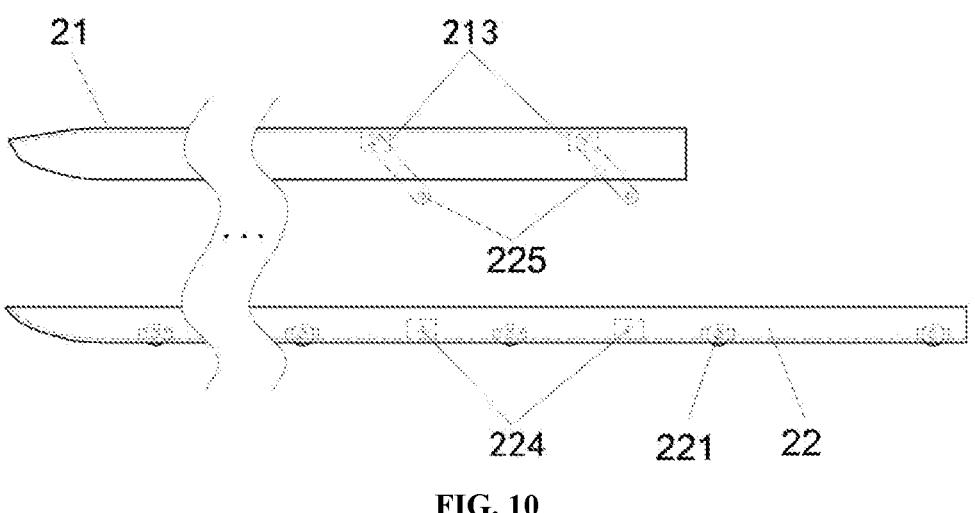
FIG. 10 is a schematic separated structural diagram of an upper cover and a base in a third embodiment of the present disclosure.
Figure 11:
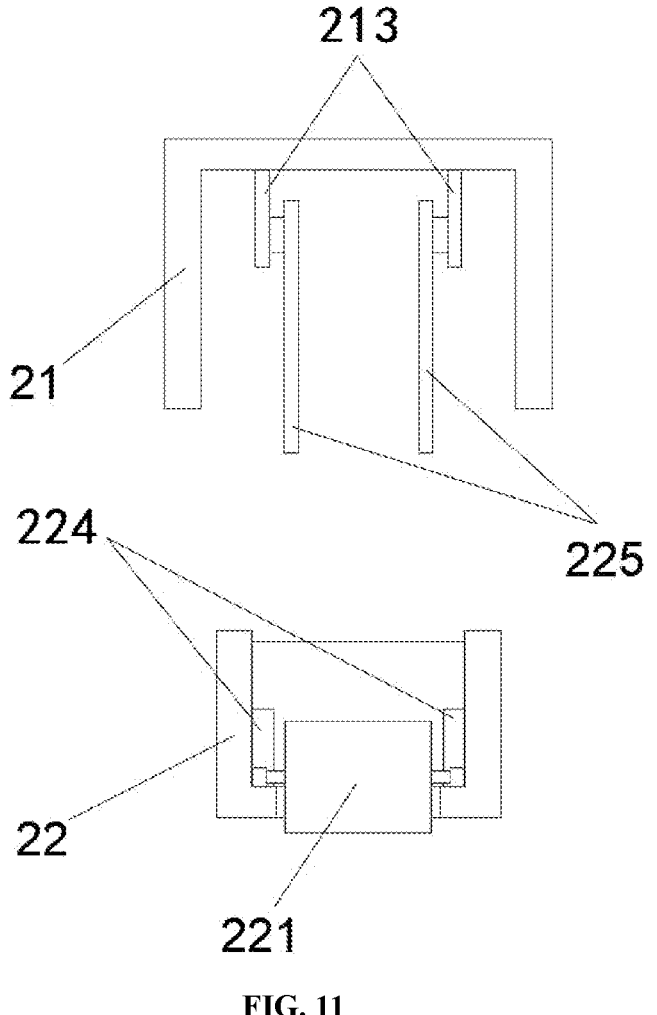
FIG. 11 is a schematic internal structural diagram of cross sections of the upper cover and the base in the third embodiment of the present disclosure.

Optionally, as shown in FIG. 10 and FIG. 11, the lifting assembly includes a first hinge seat 213, a second hinge seat 224 and a first ejector rod 225. The first hinge seat 213 is arranged on the groove bottom plate of the upper cover 21. The second hinge seat 224 is arranged on the groove bottom plate of the base 22. One end of the first ejector rod 225 is hinged with the first hinge seat 213, and the other end of the first ejector rod 225 is hinged with the second hinge seat 224. When the push-and-pull assembly 23 pushes and pulls the upper cover 21, the first ejector rod 225 rotates relative to the first hinge seat 213 and the second hinge seat 224, so that the upper cover 21 can move up and down relative to the base 22.

Further, as shown in FIG. 4 to FIG. 11, the push-and-pull assembly 23 includes push-and-pull rods 231, first push-and-pull oil cylinders 232, a first base connecting table 233 and connecting rods 234. The first base connecting table 233 is connected with each of the bases 22, so that all the bases 22 can move synchronously as a whole body. The connecting rods 234 are arranged at intervals on the upper sides of the bases 22. The length direction of each connecting rod 234 is arranged extending along the direction parallel to the width direction of the bases 22. Each upper cover 21 is hinged with one of the push-and-pull rods 231. The other ends of the push-and-pull rods 231 are hinged with the connecting rods 234. The push-and-pull rods 231 are connected into a whole body through the connecting rods 234. Each first push-and-pull oil cylinder 232 has one end which is hinged on the first base connecting table 233, and the other end which is hinged on the corresponding connecting rod 234. The first push-and-pull oil cylinders 232 drive the connecting rods 234 to telescopically move, and the connecting rods 234 drive all the push-and-pull rods 231 to move synchronously, and each the push-and-pull rod 231 respectively drives the corresponding upper cover 21 to move, so that each upper cover 21 moves up and down along the base 22.

Optionally, as shown in FIG. 18 to FIG. 21, the cargo carrying assembly includes a push-and-pull plate 24. The push-and-pull plate 24 is designed as square steel. The push-and-pull plate 24 is parallel to the groove bottom plate of the upper 21 and the groove bottom plate of the base 22. The push-and-pull plate 24 is inserted in a covering space between the upper cover 21 and the base 22. One end of the push-and-pull plate 24 extends out of the upper cover 21 in the groove length direction of the upper cover 21 and is connected with the push-and-pull assembly 2. Multiple second lifting wheels 241 are arranged at intervals on both sides of the push-and-pull plate 24. The lifting assembly includes a fourth slope 226. The fourth slope 226 is in a two-piece type. The fourth slope 226 is arranged at the groove bottom plate of the base 22 and is obliquely arranged upward from a front end of the base 22 to a rear end thereof. The push-and-pull assembly 23 pushes and pulls the push-and-pull plate 24 and the upper cover 21, so that the second lifting wheels 241 move along the fourth slope 226. The push-and-pull plate 24 is connected with the upper cover 21 as an integral whole. When the push-and-pull assembly 23 pushes and pulls the integral structure, the second lifting wheels 241 moves along the fourth slope 226 to adjust the height position of the second lifting wheels 241, so that the upper cover 21 moves up and down relative to the base 22. Wherein, the second lifting wheels 241 on both sides of the push-and-pull plate 24 are provided with corresponding fourth slopes 226, and the fourth slopes 226 are arranged in two pieces, so that the second lifting wheels 241 run more stably along the fourth slopes 226. Further, optionally, as shown in FIG. 12 to FIG. 15, the lifting assembly also includes a fifth slope 214. The fifth slope 214 is in a two-piece type. The two-piece type refers to that the fifth slope 214 is divided into two parts arranged at an interval. The fifth slope 214 is arranged on the groove bottom plate of the upper cover 21 and is obliquely arranged downward from a front end of the upper cover 21 to a rear end thereof. The push-and-pull assembly 23 pushes and pulls the push-and-pull plate 24, so that the second lifting wheels 241 move along the fourth slope 226 and the fifth slope 214. The set position of the fifth slope 214 corresponds to that of the fourth slope 226 up and down. The second lifting wheel 241 is arranged between the fourth slope 226 and the fifth slope 214. The space between the fourth slope 226 and the fifth slope 214 is gradually reduced from the front end of the upper cover 21 to the rear end thereof. When the second lifting wheel 241 moves along the fourth slope 226 and the fifth slope 214, the height position of the second lifting wheel 241 is gradually increased, and the second lifting wheel 241 expands the fourth slope 226 and the fifth slope 214, so that the spacing between the fourth slope 226 and the fifth slope 214 is gradually increased, with the result that the spacing between the upper cover 21 and the base 22 is increased, and the upper cover 21 is raised relative to the base 22. Correspondingly, when the second lifting wheel 241 moves in the opposite direction along the fourth slope 226 and the fifth slope 214, the spacing between the fourth slope 226 and the fifth slope 214 is reduced, and the upper cover 21 descends relative to the base 22. It should be noted that multiple second lifting wheels 241 are provided, and the multiple second lifting wheels 241 are arranged at intervals along the length direction of the push-and-pull plate 24. Correspondingly, multiple fourth slopes 226 and multiple fifth slopes 214 are respectively provided.

Figure 16:
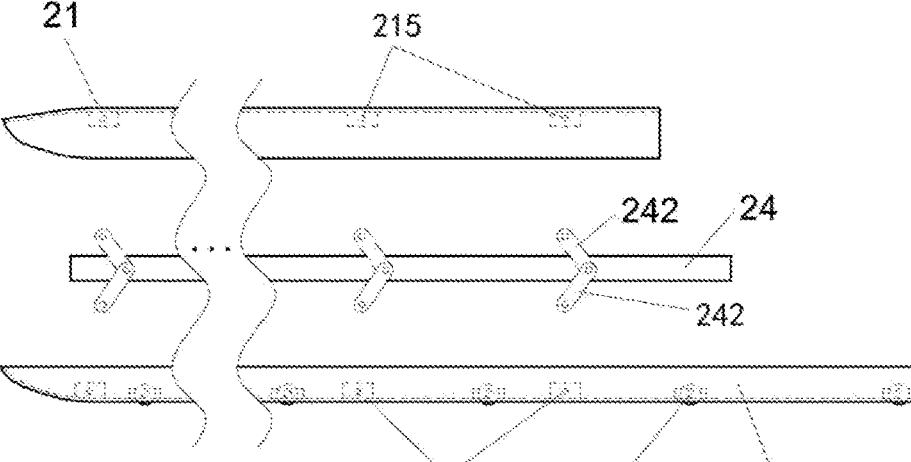
FIG. 16 is a schematic separated structural diagram of an upper cover and a base of a cargo carrying mechanism in a fifth embodiment of the present disclosure.
Figure 17:
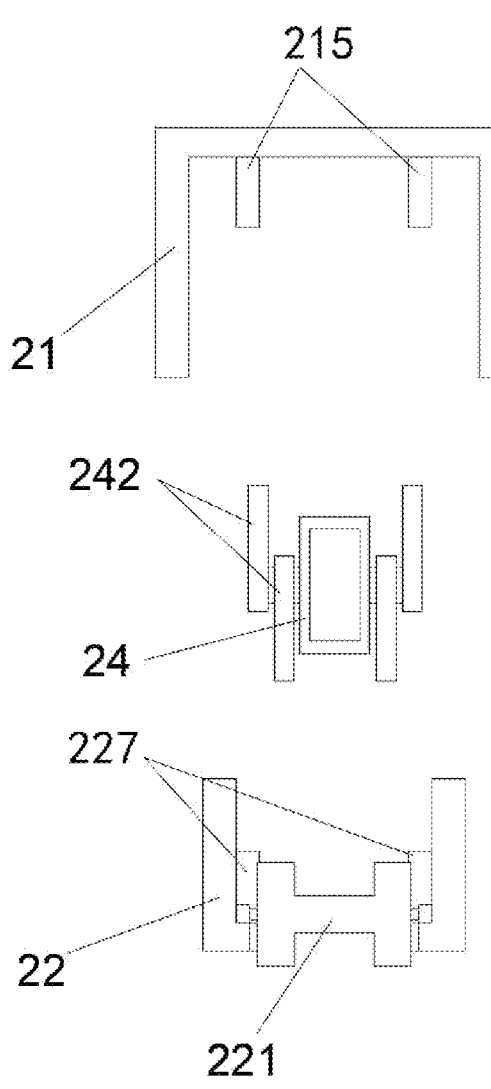
FIG. 17 is a schematic internal structural diagram of cross sections of the upper cover and the base in the fifth embodiment of the present disclosure.
Figure 18:
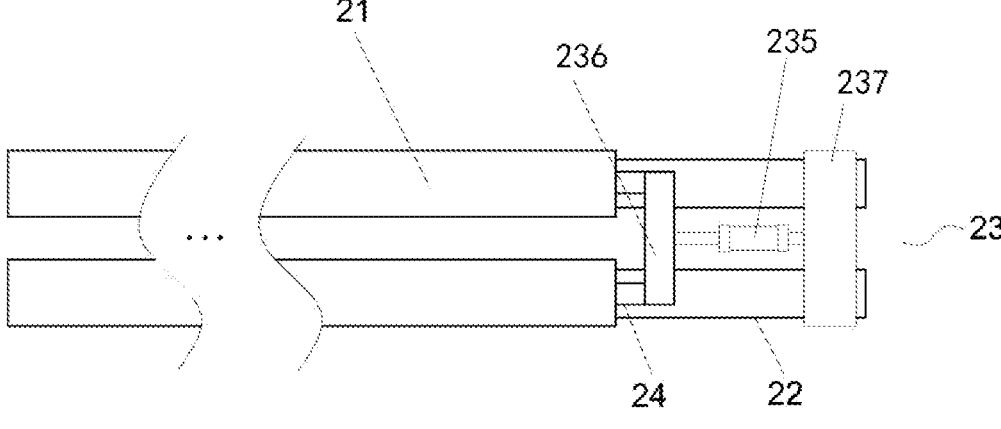
FIG. 18 is a schematic top structural view of a cargo carrying mechanism in a sixth embodiment of the present disclosure.
Figure 19:
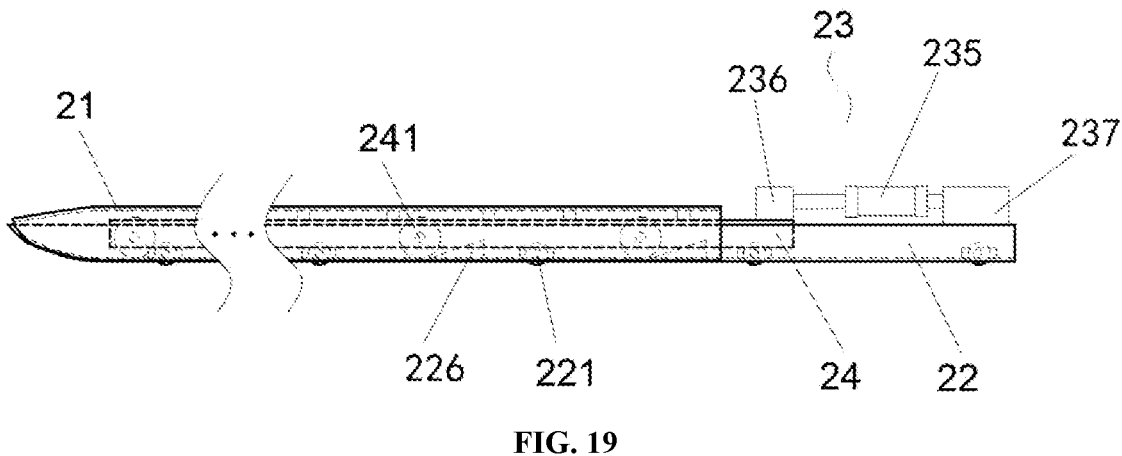
FIG. 19 is a schematic structural side view of the cargo carrying mechanism in the sixth embodiment of the present disclosure.
Figure 20:
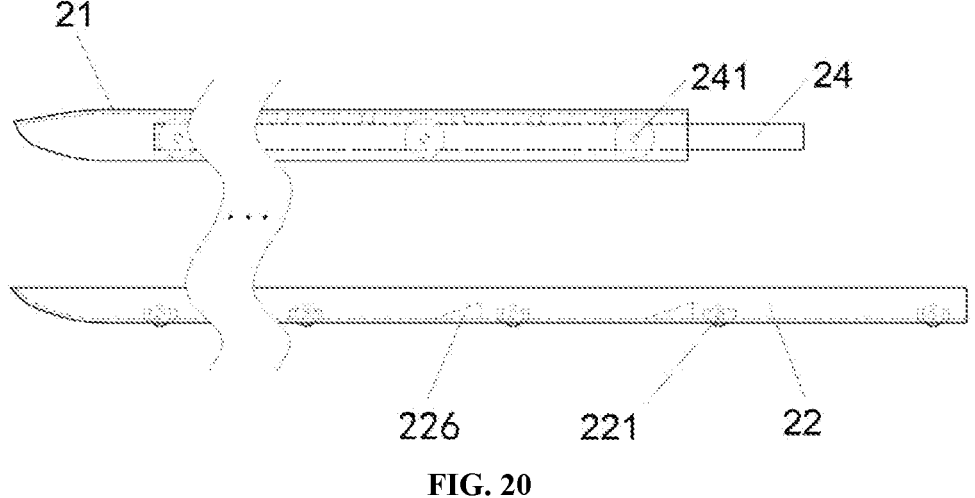
FIG. 20 is a schematic separated structural diagram of an upper cover, a base and a push-and-pull plate in FIG. 19 in the present disclosure.
Figure 21:
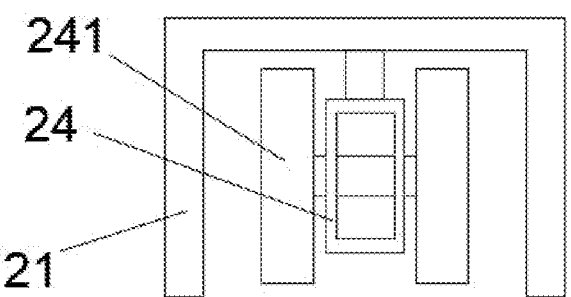
FIG. 21 is a schematic internal structural diagram of cross sections of the upper cover, the base and the push-and-pull plate in the third embodiment of the present disclosure.
Figure 21:
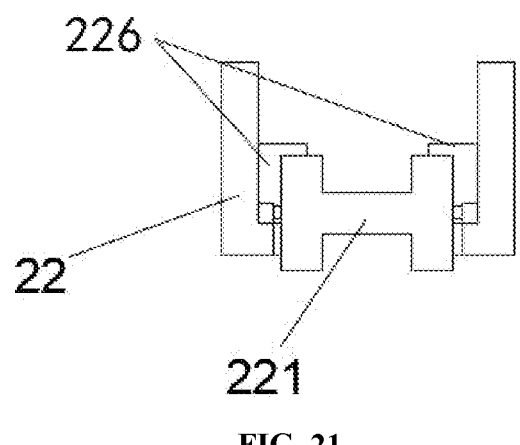
Figure 22:
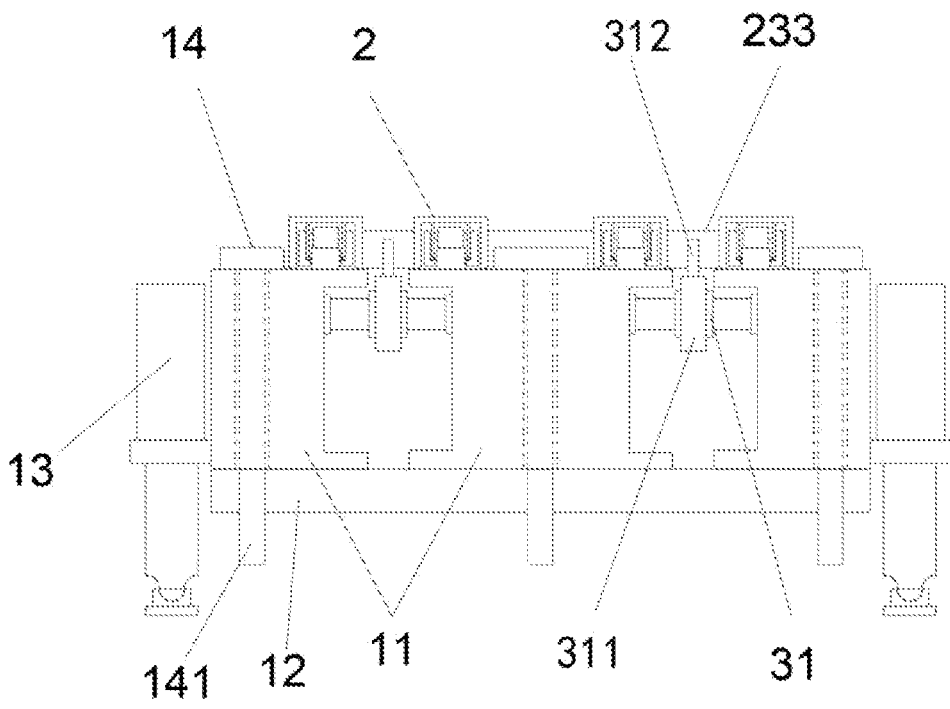
FIG. 22 is a schematic left structural view of a first power mechanism in the present disclosure.
Figure 23:
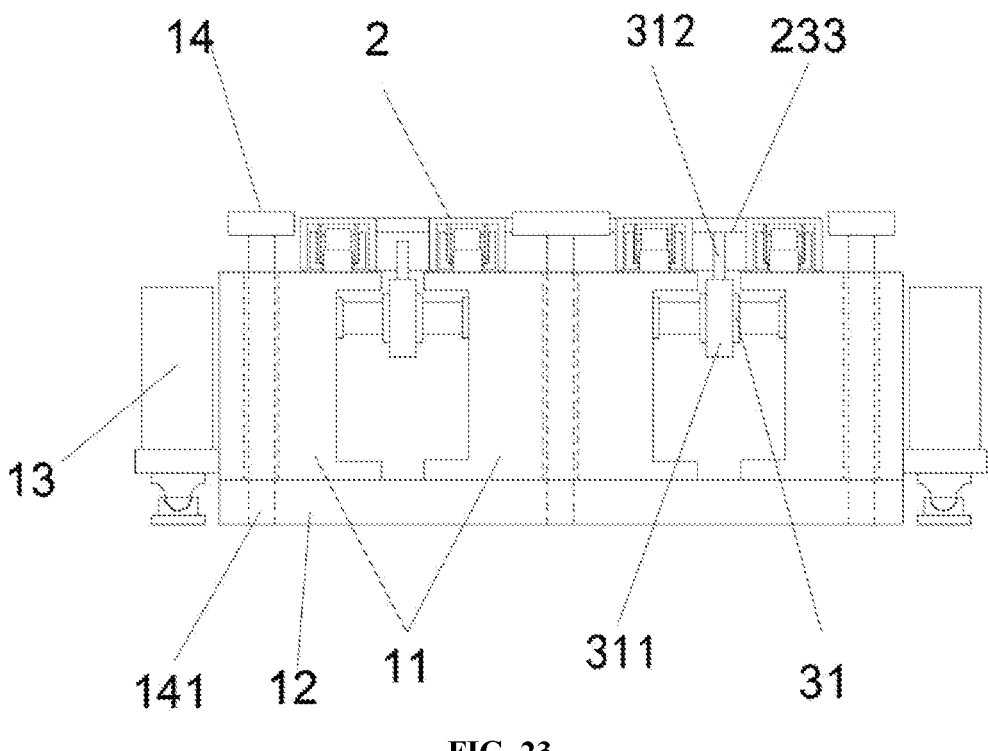
FIG. 23 is a schematic state diagram of a cargo carrying platform lowered to the lowest height in FIG. 22 in the present disclosure.
Figure 24:
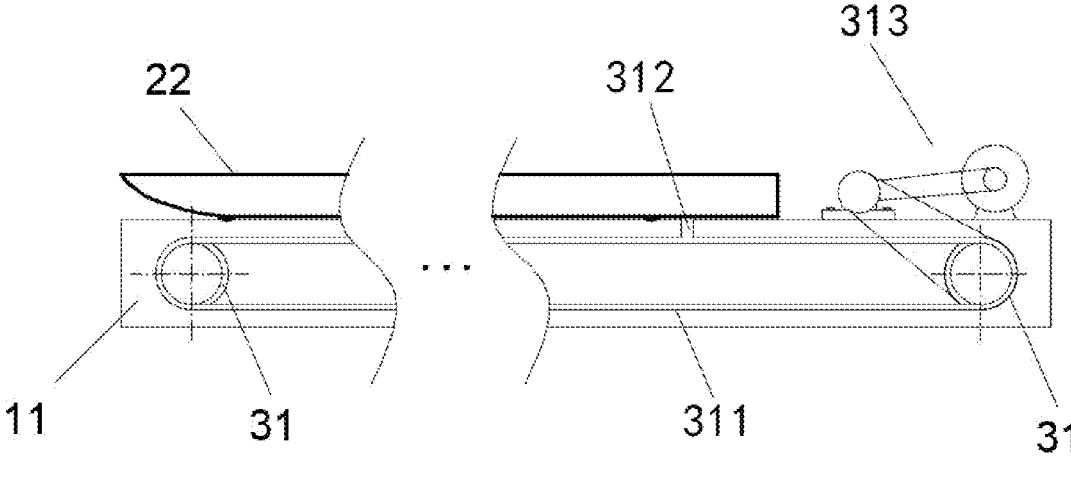
FIG. 24 is a schematic structural diagram of the first power mechanism and a base in the present disclosure.
Figure 25:
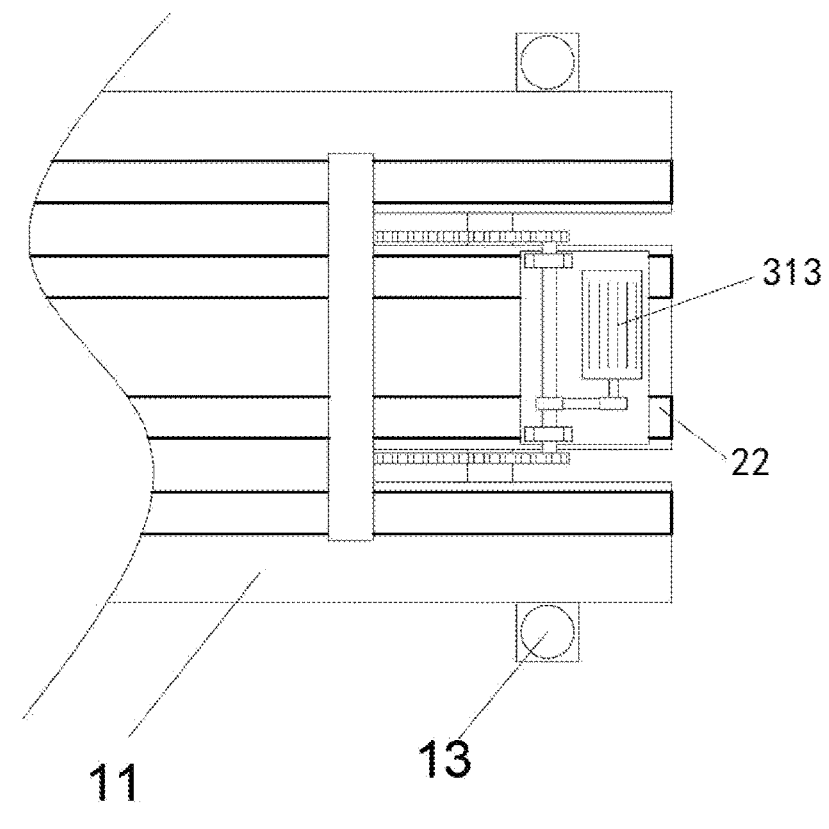
FIG. 25 is a schematic top view of a partial structure of a second power mechanism in the present disclosure.

Optionally, as shown in FIG. 16 and FIG. 17, the cargo carrying assembly includes a push-and-pull plate 24. The push-and-pull plate 24 is designed as square steel. The push-and-pull plate 24 is inserted in a covering space between the upper cover 21 and the base 22. One end of the push-and-pull plate 24 extends out of the upper cover 21 in the groove length direction of the upper cover 21 and is connected with the push-and-pull assembly 23. Multiple connections are arranged at intervals on both sides of the push-and-pull plate 24, respectively. The lifting assembly includes third hinge seats 215 fixed on the upper cover 21 and fourth hinge seats 227 fixed on the base 22. Each connection includes two second ejector rods 242. One end of each of the two second ejector rods 242 is hinged with the push-and-pull plate 24, and the other ends of the two second ejector rods 242 are respectively hinged with the corresponding third hinge seat 215 and the corresponding fourth hinge seat 227. When the push-and-pull assembly 23 pushes and pulls the push-and-pull plate 24, the push-and-pull plate 24 drives the second ejector rods 242 to move, the second ejector rods 242 drive the upper cover 21 to move, the second ejector rods 242 are rotated relative to the push-and-pull plate 24, the third hinge seats 215 and the fourth hinge seats 227, so that the upper cover 21 moves up and down relative to the base 22.

Figure 12:
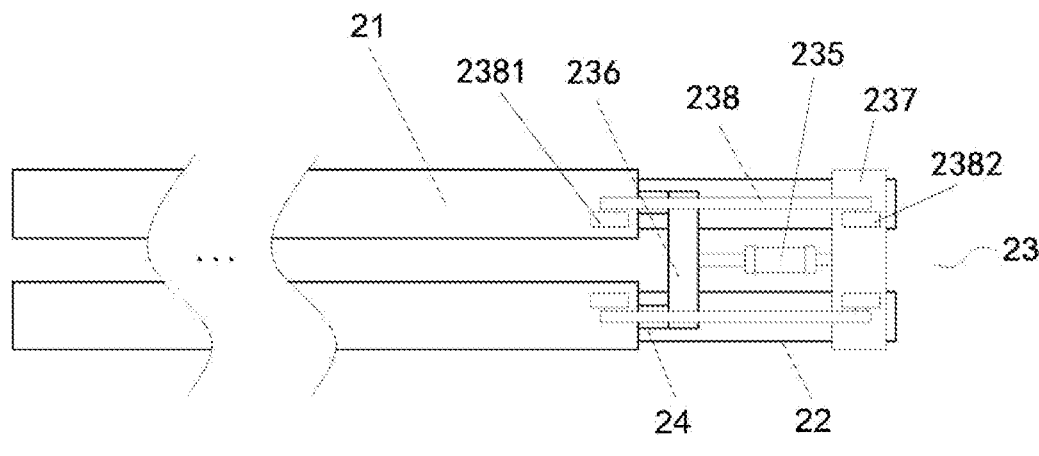
FIG. 12 is a top view of a cargo carrying mechanism in a fourth embodiment of the present disclosure.
Figure 13:
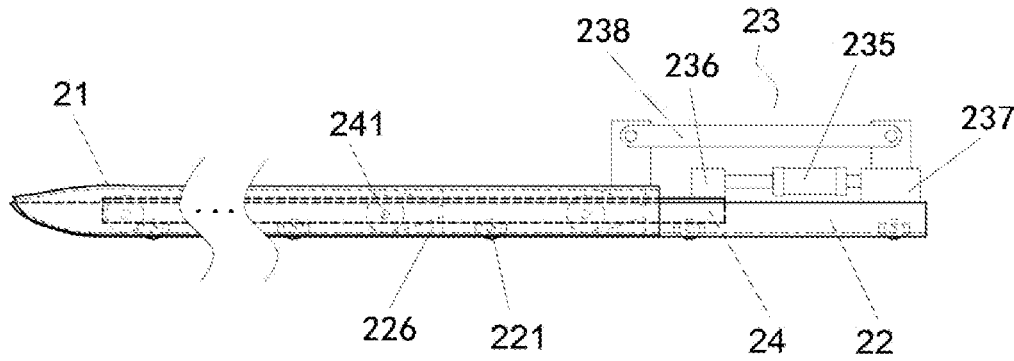
FIG. 13 is a schematic structural diagram of a side in FIG. 12 in the present disclosure.
Figure 14:
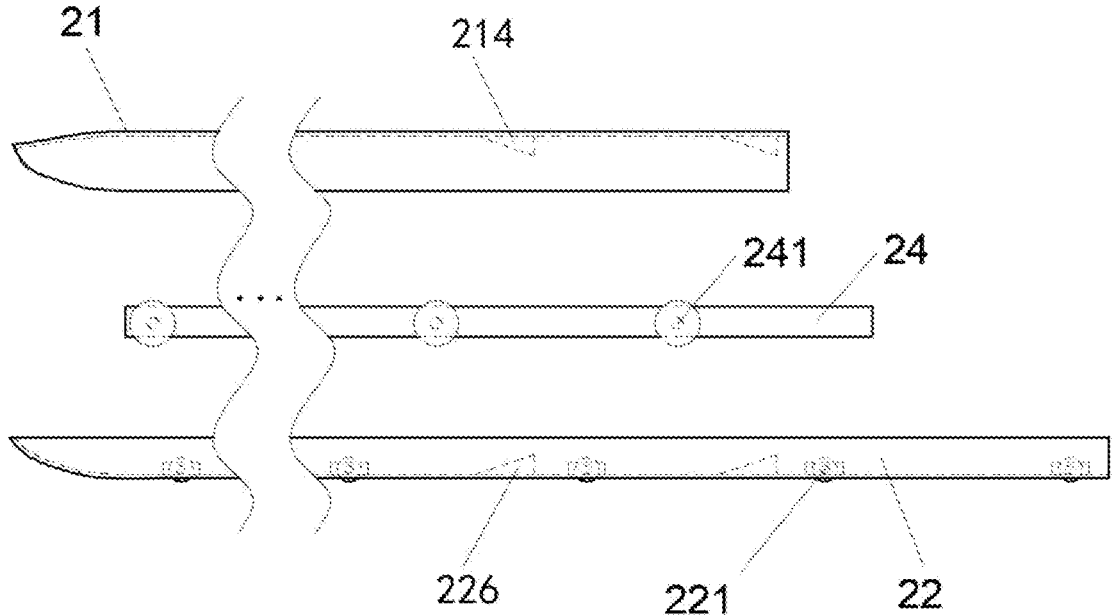
FIG. 14 is a schematic separated structural diagram of an upper cover, a base and a push-and-pull plate in FIG. 13 in the present disclosure.
Figure 15:
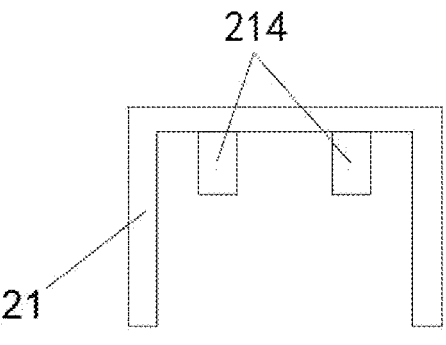
FIG. 15 is a schematic internal structural diagram of cross sections of the upper cover, the base and the push-and-pull plate in the fourth embodiment of the present disclosure.
Figure 15:
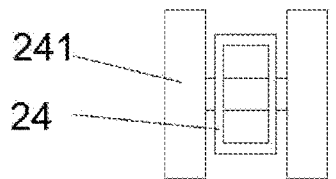
Figure 15:
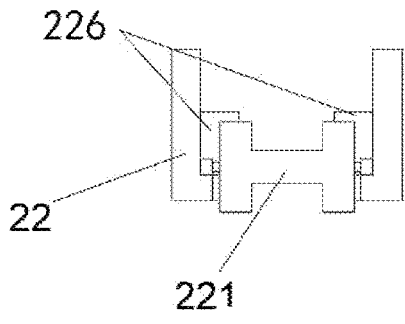

Further, as shown in FIG. 12 and FIG. 13, the push-and-pull assembly 23 includes a second push-and-pull oil cylinder 235, a push-and-pull plate connecting table 236 and a second base connecting table 237. The push-and-pull plate connecting table 236 is connected with each of the push-and-pull plates 24, so that all the push-and-pull plates 24 are connected into a whole body. The second base connecting table 237 is connected with each base 22, so that all the bases 22 are connected into a whole body. The second push-and-pull oil cylinder 235 has one end which is hinged on the push-and-pull plate connecting table 236, and the other end which is hinged on the second base connecting table 237. The second push-and-pull oil cylinder 235 drives the push-and-pull plate connecting table 236 to telescopically move, and the push-and-pull plate connecting table 236 drives each of the push-and-pull plates 24 to move, and the push-and-pull plate 24 moves in cooperation with the upper cover 21 and the base 22 through the connections provided, so that the upper cover 21 moves up and down relative to the base 22.

Further, the push-and-pull assembly 23 also includes limited connecting rods 238, first limited blocks 2381 and second limited blocks 2382. Each upper cover 21 is provided with one of the first limited blocks 2381. Multiple second limited blocks 2382 are arranged at intervals on the second base connecting table 237. The set positions of the second limited blocks 2382 correspond to those of the first limited blocks 2381 respectively. Each limited connecting rod 238 is arranged above the upper side of the corresponding base 22 in parallel. Each limited connecting rod 238 has one end which is hinged on a corresponding one of the first limited blocks 2381, and the other end which is hinged on a corresponding one of the second limited blocks 2382. The limited connecting rod 238 plays a limited role of limiting position, and can keep the upper cover vertically stable in the process of rising of the upper cover without deviation.

In the embodiment, the power mechanism 3 is used for driving the cargo carrying mechanism 2 to translate along the cargo carrying platform 11. A transmission groove is formed in the frame, and the power mechanism can be installed in the transmission groove to provide power to the cargo carrying mechanism. The power mechanism 3 is realized in multiple ways.

In an optional embodiment, as shown in FIG. 22 to FIG. 25, the power mechanism 3 includes traction chain wheels 31, a traction chain 311 and a first traction reducer 313. One of the traction chain wheels 31 is respectively installed in the front side and the rear side of the cargo carrying platform 11, wherein the front side is one side on which the push-and-pull assembly 23 is arranged. The traction chain 311 is installed on the two traction chain wheels 31. The first traction reducer 313 is installed on the rear side of the cargo carrying platform 11 and connected with the traction chain wheel 31 installed on the rear side thereof. The traction chain 31 is provided with a first connecting block 312, and the first connecting block 312 is connected with the cargo carrying mechanism 2, specifically connected with the first base connecting table or the second base connecting table on the base of the cargo carrying mechanism 2. The first traction reducer 313 drives the traction chain wheel 31 on the rear side to rotate, the traction chain wheel 31 on the rear side drives the traction chain 311 to transmit, and the traction chain 311 drives the traction chain wheel 31 on the front side to rotate. When the traction chain 311 moves, the first connecting block 312 moves synchronously to drive the cargo carrying mechanism 2 to move, so that the base 22 of the cargo carrying mechanism 2 moves along the cargo carrying platform 11.

Figure 26:
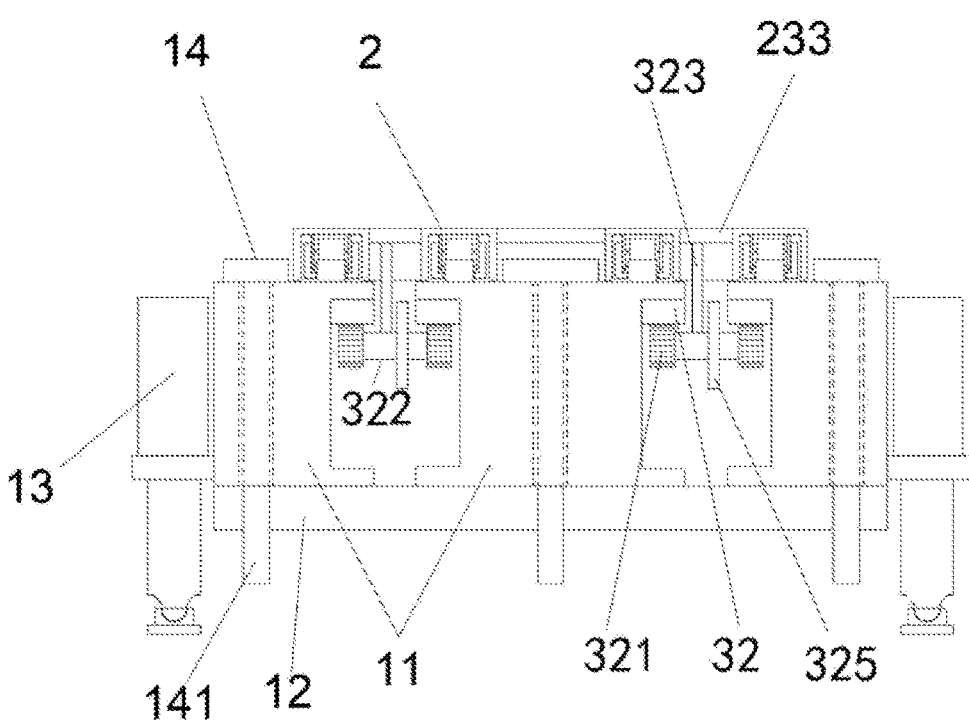
FIG. 26 is a schematic left structural view of the second power mechanism in the present disclosure.

In an optional embodiment, as shown in FIG. 26 and FIG. 27, the power mechanism 3 includes traveling racks 32, traveling gears 321, a connecting shaft 322 and a second traction reducer 324. The traveling racks 32 are installed in the cargo carrying platform 11. The connecting shaft 322 is arranged in the cargo carrying platform 11. Both ends of the connecting shaft 322 are respectively connected with one of the traveling gears 321. The traveling gear 321 is meshed with the traveling rack 32. The connecting shaft 322 is connected with a second connecting block 323 through a bearing seat. The second connecting block 323 is connected with the cargo carrying mechanism 2. A transmission gear 325 is sleeved on the connecting shaft 322. The second traction reducer 324 is arranged on the cargo carrying mechanism 2. The second traction reducer 324 is in transmission connection with the transmission gear 325 to transmit power to the transmission gear 321. The traveling gear 321 is arranged coaxially with the connecting shaft 322, a central axis of the connecting shaft 322 is arranged extending in the direction parallel to the width direction of the cargo carrying platform 11, and the length direction of the traveling rack 32 is parallel to the length direction of the cargo carrying platform 11. The second traction reducer 324 drives the transmission gear 325 to rotate. The transmission gear 325 drives the connecting shaft 322 to rotate synchronously. The connecting shaft 322 drives the traveling gear 321 to rotate synchronously. When the traveling gear 321 rotates, the traveling gear 321 drives the connecting shaft 322 to move along the synchronization rack 132, and the second connecting block 323 moves in the direction parallel to the length direction of the synchronization rack 132, and the second connecting block 323 drives the cargo carrying mechanism 2 to move.

In an optional embodiment, as shown in FIG. 28 to FIG. 30, the power mechanism 3 includes a third traction reducer 33, a steel wire rope sheave 331 and fixed pulleys 332. The third traction reducer 33 and the steel wire rope sheave 331 are both installed in the cargo carrying platform 11. The third traction reducer 33 is in transmission connection with the steel wire rope sheave 331 through a chain. One of the fixed pulleys 332 is respectively installed in the front side and the rear side of the cargo carrying platform 11. Both ends of a steel wire rope on the steel wire rope sheave 331 are each connected to the cargo carrying mechanism 2 around a corresponding one of the fixed pulleys 332. The third traction reducer 33 drives the steel wire rope sheave 331 to rotate. One end of the steel wire rope wound in the steel wire rope sheave 331 is wound on the steel wire rope sheave 331, and the other end of the steel wire rope is released from the steel wire rope sheave 331. The steel wire rope rounds the corresponding fixed pulley 332, so that the steel wire rope drives the cargo carrying mechanism 2 to translate. Further, the first base connecting table and the second base connecting table are both provided with a third connecting block 333. Both ends of the steel wire rope on the steel wire rope sheave 331 are connected to the third connecting block 333 after rounding the corresponding fixed pulley 332. When the third traction reducer 33 drives the steel wire rope sheave 331 to rotate, the steel wire rope on the steel wire rope sheave 331 draws the third connecting block 333 to move, and the third connecting block 333 drives the cargo carrying mechanism 2 to move.

It should be noted that in the embodiment, the first traction reducer, the second traction reducer and the third traction reducer are all directed to a combination of a motor and a reduction gearbox.

In order to be applicable for different width sizes of cargoes, optionally, as shown in FIG. 35 to FIG. 38, each cargo assembly is individually connected with a push-and-pull assembly, and the push-and-pull assembly drives the upper cover of the cargo carrying assembly connected with the push-and-pull assembly to move up and down. The interval between the two cargo carrying assemblies can be adjusted, so that the interval width between the two cargo carrying assemblies can be adjusted, in order that the interval width between the two cargo carrying assemblies can be adapted to carry different width sizes of cargoes, expanding the application range.

Further, one end of the cargo carrying assembly connected with the push-and-pull assembly is provided with a connecting column 25, and one end of the push-and-pull assembly connected with the cargo carrying assembly is provided with a connecting sleeve 26. The connecting column 25 is slidably arranged inside the connecting sleeve 26. The connecting column 25 is arranged coaxially with the connecting sleeve 26, and a central axis of the connecting column 25 is parallel to the width direction of the cargo carrying assembly. An end of the connecting column 25 is connected with a pushing mechanism 27 for pushing the connecting column 25. The connecting column 25 is pushed by the pushing mechanism 27, so that the connecting column 25 slides within the connecting sleeve 26. The connecting column 25 drives the cargo carrying assembly to integrally move, so that the interval between the cargo carrying assemblies is adjusted. Optionally, the pushing mechanism 27 may be a pushing oil cylinder, a screw structure, or the like.

Further, multiple liftable rollers 28 are arranged on the cargo carrying assembly at intervals, and a central axis of the liftable roller 28 is parallel to the length direction of the cargo carrying assembly. When the pushing mechanism 27 pushes the connecting column 25 to move, the liftable rollers 28 is lowered to the cargo carrying platform 11, and the liftable rollers 28 support the cargo carrying assembly, so that the friction between the cargo carrying assembly and the cargo carrying platform 11 is reduced, facilitating lateral movement of the cargo carrying assembly. Further, ends of the upper cover and the base of the cargo carrying assembly are respectively provided with a connecting column 25. Each connecting column 25 is correspondingly provided with a connecting sleeve 26. Each connecting column 25 is correspondingly provided with a pushing mechanism 27. When the pushing mechanism 27 pushes the corresponding connecting column 25, the upper cover and the base move transversely synchronously as a whole. The liftable rollers 28 are mounted on the base. When not in use, the liftable rollers 28 are moved up so as not to interfere with the longitudinal movement of the base, wherein the longitudinal movement is movement along the length direction of the cargo carrying platform 11; and when in use, the liftable rollers 28 are moved down to the cargo carrying platform 11, and the liftable rollers 28 can support the base and the upper cover, and be moved laterally along the cargo carrying platform 11. The liftable rollers 28 can be driven to move up and down by a roller adjusting oil cylinder 281, or can be adjusted to move up and down by screws 283. As shown in FIG. 38, when the lifting is adjusted by the screws 283, a fixed plate 282 is fixed on the base, the screws 283 are threaded through the fixed plate 282 to be connected to the liftable rollers 28, and the height positions of the liftable rollers 28 are adjusted by adjusting the heights position of the screws 283 relative to the fixed plate 282. The liftable rollers 28 arranged on the same cargo carrying assembly may not be installed in exactly the same manner. For example, at one end close to the push-and-pull assembly, the liftable rollers 28 can be driven to move up and down by the roller adjusting oil cylinder 281 to facilitate the installation of the oil cylinder; and while at one end away from the push-and-pull assembly, the liftable rollers 28 can be installed by screws 283, in order to minimize the installation space of the liftable rollers 28, facilitating the loading of the cargo.

Preferably, as shown in FIG. 39, positioning strips 111 are arranged at intervals on the cargo carrying platform 11. The positioning strips 111 are arranged extending along the length direction of the cargo carrying platform 11. Each positioning strips 111 is used for defining the moving position of the cargo carrying assembly in the width direction thereof. The positioning strips 111 are arranged on one side of each cargo carrying assembly, so that each carrying assembly can move to a set position when the interval between two cargo carrying assemblies is adjusted. Further, elongated slots 1111 are formed in the cargo carrying platform 11, and the positioning strips 111 are installed in the elongated slots 1111, so that the positions of the positioning strips 111 on the cargo carrying platform 11 are adjustable.

As shown in FIG. 40 and FIG. 41, multiple liftable moving wheels 112 are installed on the sides of the cargo carrying platform 11. The liftable moving wheels 112 is moved up when not in use, in order to interfere with the stable placement of the cargo carrying platform 11; and while the liftable moving wheel 112 is moved down and is supported on the ground when in use. And the integral movement of the whole lifting type carriage cargo loading and unloading device is realized through the liftable moving wheels 112.

Further, connecting plates 113 are fixed on the sides of the cargo carrying platform 11, and the connecting plates 113 are provided with though holes, and can be fixed with the cargo carrying platform 11 through screws. A sleeve 114 is fixed on the connecting plate 113. A moving wheel connecting rod 115 penetrating through the interior of the sleeve 114 is arranged on the liftable moving wheel 112. The moving wheel connecting rod 115 is detachably connected with the sleeve 114. The height position of the moving wheel 112 is adjusted by adjusting the position of the moving wheel connecting rod 115 within the sleeve 114. The moving wheel connecting rod 115 and the sleeve 114 are both provided with pin holes 1161, and the moving wheel connecting rod 115 and the sleeve 114 are fixed by inserting pins 116 into the pin holes 1161, so as to facilitate adjustment. The moving direction of the liftable moving wheel 112 can also be adjusted by rotating the moving wheel connecting rod 115. Preferably, multiple direction markers 1151 are uniformly and circumferentially arranged in the upper part of the moving wheel connecting rod 115. The direction markers 1151 are used for marking the moving direction of the liftable moving wheel 112. The direction marker 1151 may be a circular hole formed in the moving wheel connecting rod 115. Optionally, four circular holes are uniformly formed in the circumferential direction of the moving wheel connecting rod 115, respectively marking four directions. In other embodiments, the direction marker 1151 may also be a sticker adhered on the moving wheel connecting rod 115 or a marking block fixed to the moving wheel connecting rod 115.

The working process of the embodiment is as follows.

The cargo carrying platform 11 is lowered to the ground through the lifting oil cylinders 13, and while the connecting cross beams 12 are placed on the ground, the supporting platform 14 is jacked up by the support columns 141, so that the supporting platform 14 is the same height as the surface of the upper cover 2 of the cargo carrying mechanism 2. Then, the bottom space of the cargo carrier is forked into by a forklift, and the cargo on the carrier is transported to the cargo carrying mechanism 2, with legs of the cargo carrier being exactly arranged on the supporting platform 14. And the above operation is repeated, until loading of the cargo is completed. After that, the cargo carrying platform 11 is jacked up through the lifting oil cylinders 13 to rise to the same height as the wagon carriage, so that the cargo carrying platform 11 is aligned with the wagon carriage. When the cargo carrying platform 11 rises, the supporting platform 14 falls. At the same time, the push-and-pull oil cylinder is started to push the upper cover 21 backward or pull the square steel, so that the upper cover 21 is moved up to bear the bottom of the cargo carrier, and the legs of the cargo carrier leave the surface of the supporting platform 14. At this time, the power mechanism 3 is started to provide traction force for the base 22 and draw the base 22 to travel into the carriage. When the cargo completely enters the carriage, the push-and-pull oil cylinder is started in the opposite direction, the upper cover 21 falls immediately therewith, and the carrier of the cargo falls on a bottom surface of the carriage. At this time, the traction reducer of the power mechanism is started again to rotate in the opposite direction, so that the cargo carrying mechanism 2 is retracted. The height of the legs of the carrier needs to be greater than that of the top of the upper cover 21 at the lowest position and less than that of the top of the upper cover 21 at the highest position.

The foregoing descriptions are merely preferable embodiments of the present disclosure. It should be noted that those skilled in the art can make several improvements or substitutions without departing from the technical principle of the present disclosure, and the improvements or substitutions shall fall within the scope of the present disclosure.

What is claimed is:

1. A lifting type carriage cargo loading and unloading device, comprising:

a frame comprising a cargo carrying platform, lifting oil cylinders and a supporting platform; the lifting oil cylinders are connected to both sides of the cargo carrying platform, the supporting platform is arranged on an upper surface of the cargo carrying platform, a lower surface of the supporting platform is provided with support columns, and the support columns are slidably penetrated into the cargo carrying platform and extend beyond a lower surface of the cargo carrying platform;

a cargo carrying mechanism, which is movably installed on the cargo carrying platform, and comprises a push-and-pull assembly and at least two cargo carrying assemblies; and the at least two cargo carrying assemblies are arranged at intervals, each cargo carrying assembly is provided with an upper cover which is liftable, and the push-and-pull assembly is driving the upper cover to rise or restore the upper cover; and a power mechanism installed on the cargo carrying platform or in the frame, and connected with the cargo carrying mechanism, to drive the cargo carrying mechanism to move along the cargo carrying platform;

wherein the lifting oil cylinders drive the cargo carrying platform to move up and down, and wherein the supporting platform is flush with an upper surface of the upper cover or the supporting platform is lower than the upper surface of the upper cover;

wherein each cargo carrying assembly further comprises a base and a plurality of lifting assemblies, the base is movably installed on the cargo carrying platform, the upper cover is covered on the base, the base is connected with the upper cover through the lifting assemblies, and the push-and-pull assembly is installed on the base.

2. The lifting type carriage cargo loading and unloading device according to claim 1, wherein the lower surface of the cargo carrying platform is provided with a plurality of connecting cross beams, and a height of each support column is equal to a sum of a height of the cargo carrying platform, a height of one of the connecting cross beams and a height of the cargo carrying mechanism.

3. The lifting type carriage cargo loading and unloading device according to claim 2, wherein each connecting cross beam has an I-shaped cross section, and is provided with a universal wheel at its lower side, and a fixed clamping groove is formed at a top of the universal wheel, and the fixed clamping groove is detachably connected with a corresponding one of the connecting cross beams.

4. The lifting type carriage cargo loading and unloading device according to claim 1, wherein a lower surface of one end of the base away from the push-and-pull assembly is arc-shaped, and a lower surface and an upper surface of one end of the upper cover away from the push-and-pull assembly are both arc-shaped.

5. The lifting type carriage cargo loading and unloading device according to claim 1, wherein both the upper cover and the base have channel steel structures, the base is embedded in a groove of the upper cover, and the lifting assemblies are installed between a groove bottom plate of the base and a groove bottom plate of the upper cover.

6. The lifting type carriage cargo loading and unloading device according to claim 5:

wherein each of the lifting assemblies comprises a first lifting wheel and a first slope, the first lifting wheel is rotatably installed on the groove bottom plate of the upper cover, the first slope is arranged on the groove bottom plate of the base, the first slope is obliquely arranged upward from a front end of the base to a rear end of the base, and the push-and-pull assembly pushes and pulls the upper cover, and wherein the first lifting wheel moves along the first slope;

wherein each of the lifting assemblies comprises a second slope and a third slope, the second slope is arranged on the groove bottom plate of the base, the second slope is obliquely arranged upward from a front end of the base to a rear end of the base, the third slope is arranged on the groove bottom plate of the upper cover, the third slope is obliquely arranged downward from a front end of the upper cover to a rear end of the upper cover, the push-and-pull assembly pushes and pulls the upper cover, and the third slope moves along the second slope; or wherein each of the lifting assemblies comprises a first hinge seat, a second hinge seat and a first ejector rod, the first hinge seat is arranged on the groove bottom plate of the upper cover, the second hinge seat is arranged on the groove bottom plate of the base, one end of the first ejector rod is hinged with the first hinge seat, and another end of the first ejector rod is hinged with the second hinge seat.

7. The lifting type carriage cargo loading and unloading device according to claim 6, wherein the push-and-pull assembly comprises push-and-pull rods, first push-and-pull oil cylinders, a first base connecting table and connecting rods, the first base connecting table is connected with each base, the connecting rods are arranged at intervals on upper sides of all the bases, each upper cover is hinged with one of the push-and-pull rods, another end of each push-and-pull rod is hinged with one of the connecting rods, and each first push-and-pull oil cylinder has one end which is hinged on the first base connecting table, and another end which is hinged on one of the connecting rods.

8. The lifting type carriage cargo loading and unloading device according to claim 5:

wherein each cargo carrying assembly further comprises a push-and-pull plate, the push-and-pull plate is inserted in a covering space between the upper cover and the base, one end of the push-and-pull plate extends out of the upper cover in a groove length direction of the upper cover and is connected with the push-and-pull assembly, and a plurality of second lifting wheels is arranged at intervals on both sides of the push-and-pull plate; and each of the lifting assemblies comprises a fourth slope, the fourth slope is in a two-piece type, the fourth slope is arranged on the groove bottom plate of the base and is obliquely arranged upward from a front end of the base to a rear end of the base, and the push-and-pull assembly pushes and pulls the push-andpull plate and the upper cover, and wherein the second lifting wheels move along the fourth slope; or wherein each cargo carrying assembly further comprises a push-and-pull plate, the push-and-pull plate is inserted in a covering space between the upper cover and the base, one end of the push-and-pull plate extends out of the upper cover in a groove length direction of the upper cover and is connected with the push-and-pull assembly, a plurality of connections is arranged at intervals on both sides of the push-and-pull plate, each of the lifting assemblies comprises a third hinge seat fixed on the upper cover and a fourth hinge seat fixed on the base, each connection comprises two second ejector rods, one end of each of the two second ejector rods is hinged with the push-and-pull plate, and the other ends of the two second ejector rods are respectively hinged with the third hinge seat and the fourth hinge seat.

9. The lifting type carriage cargo loading and unloading device according to claim 8, wherein each of the lifting assemblies further comprises a fifth slope, the fifth slope is in a two-piece type, the fifth slope is arranged on the groove bottom plate of the upper cover and is obliquely arranged downward from a front end of the upper cover to a rear end of the upper cover; and the push-and-pull assembly pushes and pulls the push-and-pull plate, and wherein the second lifting wheels move along the fourth slope and the fifth slope.

10. The lifting type carriage cargo loading and unloading device according to claim 8, wherein the push-and-pull assembly comprises a second push-and-pull oil cylinder, a push-and-pull plate connecting table and a second base connecting table, the push-and-pull plate connecting table is connected with each push-and-pull plate, the second base connecting table is connected with each base, and the second push-and-pull oil cylinder has one end which is hinged on the push-and-pull plate connecting table, and another end which is hinged on the second base connecting table.

11. The lifting type carriage cargo loading and unloading device according to claim 10, wherein the push-and-pull assembly also comprises limited connecting rods, first limited blocks and second limited blocks, each upper cover is provided with one of the first limited blocks, a plurality of second limited blocks is arranged at intervals on the second base connecting table, set positions of the second limited blocks correspond to those of the first limited blocks, respectively, each limited connecting rod is arranged on upper side of the corresponding base in parallel, and each limited connecting rod has one end which is hinged on a corresponding one of the first limited blocks, and another end which is hinged on a corresponding one of the second limited blocks.

12. The lifting type carriage cargo loading and unloading device according to claim 1:

wherein the power mechanism comprises traction chain wheels, a traction chain and a first traction reducer, both of the traction chain wheels are respectively installed in a front side and a rear side of the cargo carrying platform, the traction chain is installed on said both of the traction chain wheels, the first traction reducer is installed on the rear side of the cargo carrying platform and connected with the traction chain wheel installed on the rear side of the cargo carrying platform, the traction chain is provided with a first connecting block, and the first connecting block is connected with the cargo carrying mechanism;

wherein the power mechanism comprises traveling racks, traveling gears, a connecting shaft and a second traction reducer, the traveling racks are installed in the cargo carrying platform, the connecting shaft is arranged in the cargo carrying platform, both ends of the connecting shaft are respectively connected with one of the traveling gears, each traveling gear is meshed with a corresponding one of the traveling racks, the connecting shaft is connected with a second connecting block through a bearing seat, and the second connecting block is connected with the cargo carrying mechanism; and a transmission gear is sleeved on the connecting shaft, the second traction reducer is arranged on the cargo carrying mechanism, and the second traction reducer is in transmission connection with the transmission gear; or the power mechanism comprises a third traction reducer, a steel wire rope sheave and fixed pulleys, the third traction reducer and the steel wire rope sheave are both installed in the cargo carrying platform, the third traction reducer is in transmission connection with the steel wire rope sheave, one of the fixed pulleys is respectively installed in the front side and the rear side of the cargo carrying platform, and both ends of a steel wire rope on the steel wire rope sheave are each connected to the cargo carrying mechanism around a corresponding one of the fixed pulleys.

13. The lifting type carriage cargo loading and unloading device according to claim 1, wherein an oil cylinder synchronization mechanism is installed between the lifting oil cylinders arranged on both sides of the cargo carrying platform, the oil cylinder synchronization mechanism comprises a synchronization cross bar, both ends of the synchronization cross bar are respectively connected with a corresponding one of the lifting oil cylinders, two synchronization racks are vertically arranged on the synchronization cross bar, and slot holes configured to accommodate the synchronization racks are formed in the frame; and a synchronization shaft is rotatably arranged in the frame, both ends of the synchronization shaft are respectively provided with a synchronization gear, and each synchronization gear is respectively meshed and connected with a corresponding one of the synchronization racks.

14. The lifting type carriage cargo loading and unloading device according to claim 1, wherein the push-and-pull assembly is plural in number, each cargo carrying assembly is respectively connected with one of the push-and-pull assemblies, and an interval between the two cargo carrying assemblies is adjustable.

15. The lifting type carriage cargo loading and unloading device according to claim 14, wherein one end of each cargo carrying assembly connected with said one of the push-and-pull assemblies is provided with a connecting column, one end of each push-and-pull assembly connected with a corresponding one of the cargo carrying assemblies is provided with a connecting sleeve, the connecting column is slidably arranged inside the connecting sleeve, and an end of the connecting column is connected with a pushing mechanism configured to push the connecting column; and a plurality of liftable rollers is arranged on each cargo carrying assembly at intervals, and a central axis of each liftable roller is parallel to a length direction of the corresponding one of the cargo carrying assemblies.

16. The lifting type carriage cargo loading and unloading device according to claim 14, wherein positioning strips are arranged at intervals on the cargo carrying platform, the positioning strips are arranged extending along a length direction of the cargo carrying platform, and each positioning strip is configured to define a moving position of the corresponding one of the cargo carrying assemblies in a width direction thereof.

17. The lifting type carriage cargo loading and unloading device according to claim 1, wherein a plurality of liftable moving wheels is installed on the sides of the cargo carrying platform.

18. The lifting type carriage cargo loading and unloading device according to claim 17, wherein connecting plates are fixed on the sides of the cargo carrying platform, a sleeve is fixed on each connecting plate, a moving wheel connecting rod penetrating through an interior of the sleeve is arranged on each liftable moving wheel, and the moving wheel connecting rod is detachably connected with the sleeve.

19. The lifting type carriage cargo loading and unloading device according to claim 18, wherein a plurality of direction markers is uniformly and circumferentially arranged in an upper part of the moving wheel connecting rod.

* * * * *